US008041304B2

(12) United States Patent
Yamada et al.

(10) Patent No.: US 8,041,304 B2
(45) Date of Patent: Oct. 18, 2011

(54) AREA ESTIMATION SYSTEM, AREA ESTIMATION METHOD AND AREA ESTIMATION APPARATUS

(75) Inventors: Naoharu Yamada, Yokohama (JP); Yoshinori Isoda, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 562 days.

(21) Appl. No.: 12/190,919

(22) Filed: Aug. 13, 2008

(65) Prior Publication Data

US 2009/0047909 A1 Feb. 19, 2009

(30) Foreign Application Priority Data

Aug. 13, 2007 (JP) ................................ P2007-210929

(51) Int. Cl.
*H04B 17/00* (2006.01)

(52) U.S. Cl. .................. 455/67.11; 455/456.1; 455/205; 455/226.4; 455/423; 455/457; 455/226.2; 455/456.6; 342/450; 342/451; 342/465; 375/267; 333/128; 333/247

(58) Field of Classification Search ............... 455/67.11, 455/456.1, 205, 226.4, 228, 456.2, 67, 456.6, 455/457, 423; 333/128, 247; 342/465
See application file for complete search history.

(56) References Cited

U.S. PATENT DOCUMENTS

| | | | | |
|---|---|---|---|---|
| 5,640,146 A | * | 6/1997 | Campana, Jr. .............. | 340/573.4 |
| 5,714,937 A | * | 2/1998 | Campana, Jr. .............. | 340/573.1 |
| 6,839,027 B2 | * | 1/2005 | Krumm et al. ................. | 342/465 |
| 7,313,392 B2 | * | 12/2007 | Cheng .......................... | 455/423 |

(Continued)

FOREIGN PATENT DOCUMENTS

| | | |
|---|---|---|
| JP | 9-311184 | 12/1997 |
| JP | 10-42344 | 2/1998 |

(Continued)

OTHER PUBLICATIONS

Tomoaki Ogawa, et al., "A New In-door Location Detection Method Adopting Learning Algorithms", Proceedings of the First IEEE International Conference on Pervasive Computing and Communications (perCom'03), 2003, 6 pages.

*Primary Examiner* — Marceau Milord
(74) *Attorney, Agent, or Firm* — Oblon, Spivak, McClelland, Maier & Neustadt, L.L.P.

(57) ABSTRACT

An area estimation apparatus 100 includes: a reception level receiving unit 110 configured to receive, from a plurality of the radio signal capturing terminals 40a and 40b via the network, a radio signal reception level transmitted from the radio signal transmitting terminal 10, a radio signal transmitting terminal ID for uniquely identifying the radio signal transmitting terminal 10, and a radio signal capturing terminal ID for uniquely identifying each of the plurality of radio signal capturing terminals 40a and 40b; with a presence area of the radio signal capturing terminals being known; a reception level storage unit 123 configured to store the radio signal reception level, the radio signal transmitting terminal ID and the radio signal capturing terminal ID, which are received from each of the radio signal capturing terminals 40a and 40b, in association with one another; and a presence area estimating unit 140 configured to refer to the reception level storage unit and to estimate the presence area of the radio signal transmitting terminal 10, by using at least one presence area of at least one radio signal capturing terminal 40a identified by at least one radio signal capturing terminal ID associated with a predetermined range of at least one radio signal reception level.

17 Claims, 20 Drawing Sheets

U.S. PATENT DOCUMENTS

| | | | |
|---|---|---|---|
| 7,336,961 B1 * | 2/2008 | Ngan | 455/456.1 |
| 7,756,528 B2 * | 7/2010 | Yamada et al. | 455/456.1 |
| 2006/0068775 A1 * | 3/2006 | Wu et al. | 455/426.2 |

FOREIGN PATENT DOCUMENTS

| | | |
|---|---|---|
| JP | 2004-242122 | 8/2004 |
| JP | 2004-312079 | 11/2004 |
| JP | 2006-138732 | 6/2006 |
| JP | 2006-145223 | 6/2006 |
| JP | 2007-71816 | 3/2007 |
| JP | 2007-132884 | 5/2007 |
| WO | WO 2004/008795 A1 | 1/2004 |
| WO | WO 2004/019559 A2 | 3/2004 |
| WO | WO 2005/011321 A1 | 2/2005 |

* cited by examiner

| RADIO SIGNAL CAPTURING TERMINAL ID | PRESENCE AREA |
|---|---|
| 00:11:22:33:44:01 | YAMADA'S SEAT |
| 00:11:22:33:44:02 | YAMADA'S SEAT |
| 00:11:22:33:44:03 | YOSHIDA'S SEAT |
| 00:11:22:33:44:04 | SUZUKI'S SEAT |
| 00:11:22:33:44:05 | SUZUKI'S SEAT |
| 00:11:22:33:44:06 | TANAKA'S SEAT |
| 00:11:22:33:44:07 | TANAKA'S SEAT |
| 00:11:22:33:44:08 | KOIZUMI'S SEAT |
| 00:11:22:33:44:09 | KOIZUMI'S SEAT |
| 00:11:22:33:44:10 | KOIZUMI'S SEAT |
| 00:11:22:33:44:11 | KOIZUMI'S SEAT |

FIG. 4A

| RADIO SIGNAL TRANSMITTING TERMINAL ID | MOBILE USER NAME |
|---|---|
| 00:11:22:33:44:A1 | SUZUKI |
| 00:11:22:33:44:A2 | YOSHIDA |

FIG. 4B

| | |
|---|---|
| RECEPTION LEVEL AGGREGATION METHOD (1: AVERAGE VALUE, 2: MEDIAN VALUE, 3: MAXIMUM VALUE) | 3 |
| THRESHOLD Rc WHICH SPECIFIES THE GROUP OF RADIO SIGNAL CAPTURING TERMINALS EXISTING NEAR THE RADIO SIGNAL TRANSMITTING TERMINAL | 20 |
| CONFIDENCE FACTOR THRESHOLD Pc | 80 |

FIG. 5

| RADIO SIGNAL TRANSMITTING TERMINAL ID | RADIO SIGNAL CAPTURING TERMINAL ID | RECEPTION LEVEL | OBTAINING TIME |
|---|---|---|---|
| 00:11:22:33:44:A1 | 00:11:22:33:44:01 | 80 | 2005-11-1-08:01:50:10 |
| 00:11:22:33:44:A1 | 00:11:22:33:44:02 | 90 | 2005-11-1-08:01:50:10 |
| 00:11:22:33:44:A1 | 00:11:22:33:44:03 | 85 | 2005-11-1-08:01:50:10 |
| 00:11:22:33:44:A1 | 00:11:22:33:44:04 | 70 | 2005-11-1-08:01:50:10 |
| 00:11:22:33:44:A1 | 00:11:22:33:44:05 | 75 | 2005-11-1-08:01:50:10 |
| 00:11:22:33:44:A1 | 00:11:22:33:44:06 | 95 | 2005-11-1-08:01:50:10 |
| 00:11:22:33:44:A1 | 00:11:22:33:44:07 | 85 | 2005-11-1-08:01:50:10 |
| 00:11:22:33:44:A1 | 00:11:22:33:44:08 | 85 | 2005-11-1-08:01:50:10 |
| 00:11:22:33:44:A1 | 00:11:22:33:44:09 | 80 | 2005-11-1-08:01:50:10 |
| 00:11:22:33:44:A1 | 00:11:22:33:44:10 | 80 | 2005-11-1-08:01:50:10 |
| 00:11:22:33:44:A1 | 00:11:22:33:44:11 | 70 | 2005-11-1-08:01:50:10 |
| 00:11:22:33:44:A1 | 00:11:22:33:44:01 | 75 | 2005-11-1-08:01:50:11 |
| 00:11:22:33:44:A1 | 00:11:22:33:44:02 | 100 | 2005-11-1-08:01:50:11 |
| 00:11:22:33:44:A1 | 00:11:22:33:44:03 | 90 | 2005-11-1-08:01:50:11 |
| 00:11:22:33:44:A2 | 00:11:22:33:44:03 | 100 | 2005-11-1-08:01:50:11 |

| m=1 | m=2 | m=3 |
|---|---|---|
| ■$R(a_1^1)=80$ ■$R(a_2^1)=100$ Max | ■$R(a_1^2)=90$ | △$R(a_1^3)=70$ △$R(a_2^3)=75$ |

| m=4 | m=5 |
|---|---|
| ■$R(a_1^4)=95$ ■$R(a_2^4)=85$ | ■$R(a_1^5)=85$  △$R(a_4^5)=70$  ■$R(a_3^5)=80$  ■$R(a_2^5)=80$ |

☐ : AREA
■ : RADIO SIGNAL CAPTURING TERMINAL EXISTING NEAR THE RADIO SIGNAL TRANSMITTING TERMINAL
△ : RADIO SIGNAL CAPTURING TERMINAL OTHER THAN THE ABOVE

| RADIO SIGNAL CAPTURING TERMINAL ID | AREA m | RADIO SIGNAL CAPTURING TERMINAL j IN THE AREA |
|---|---|---|
| 00:11:22:33:44:01 | 1 | 1 |
| 00:11:22:33:44:02 | 1 | 2 |
| 00:11:22:33:44:03 | 2 | 1 |
| 00:11:22:33:44:04 | 3 | 1 |
| 00:11:22:33:44:05 | 3 | 2 |
| 00:11:22:33:44:06 | 4 | 1 |
| 00:11:22:33:44:07 | 4 | 2 |
| 00:11:22:33:44:08 | 5 | 1 |
| 00:11:22:33:44:09 | 5 | 2 |
| 00:11:22:33:44:10 | 5 | 3 |
| 00:11:22:33:44:11 | 5 | 4 |

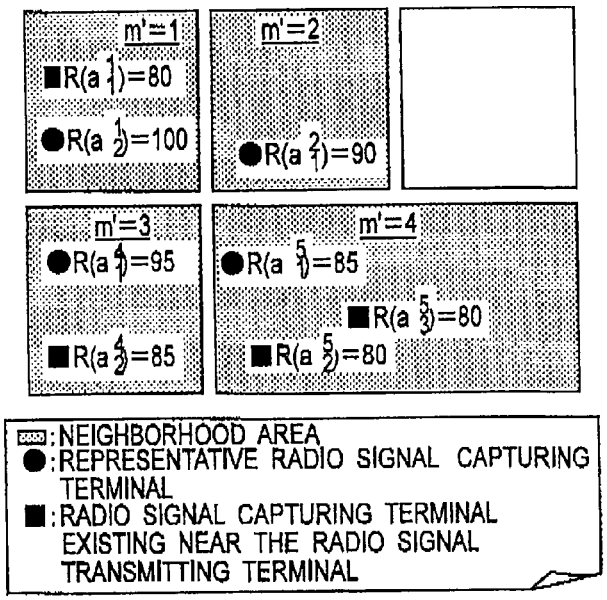
FIG. 8
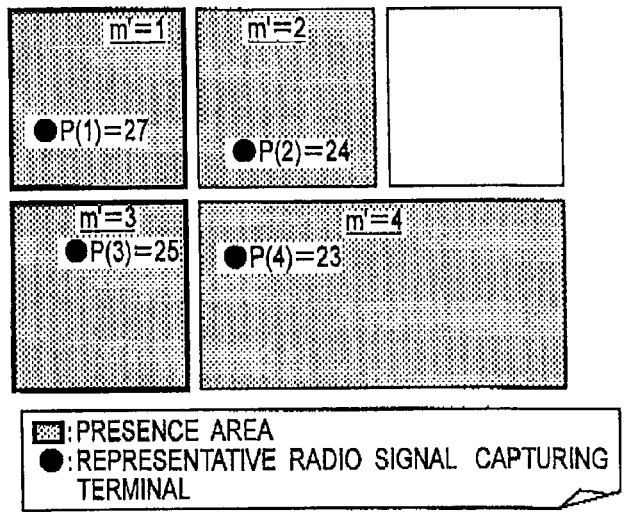
FIG. 9
FIG. 10
| RADIO SIGNAL TRANSMITTING TERMINAL ID | PRESENCE AREA | ESTIMATION TIME |
|---|---|---|
| 00:11:22:33:44:A1 | YAMADA'S/TANAKA'S SEAT | 2005-11-1-08:01:50:11 |
| 00:11:22:33:44:A2 | YOSHIDA'S SEAT | 2005-11-1-08:01:50:11 |

FIG. 12

| RADIO SIGNAL TRANSMITTING TERMINAL ID | IP ADDRESS | MOBILE USER NAME |
|---|---|---|
| 00:11:22:33:44:A1 | 172.21.2.1 | SUZUKI |
| 00:11:22:33:44:A2 | 172.21.2.2 | YOSHIDA |

FIG. 13

| RADIO SIGNAL CAPTURING TERMINAL ID | IP ADDRESS | PRESENCE AREA |
|---|---|---|
| 00:11:22:33:44:01 | 172.21.1.1 | YAMADA'S SEAT |
| 00:11:22:33:44:02 | 172.21.1.2 | SUZUKI'S SEAT |
| 00:11:22:33:44:03 | 172.21.1.3 | YOSHIDA'S SEAT |

FIG. 17A

| RADIO SIGNAL CAPTURING TERMINAL ID | ESTIMATION FREQUENCY |
|---|---|
| YAMADA | 1s |
| EMPLOYEE | 1s |
| VISITOR | 100s |
| OTHER | 10s |

FIG. 17B

| PRESENCE AREA | ESTIMATION FREQUENCY |
|---|---|
| CAFETERIA | 100s |
| CORRIDOR | 1s |
| MEETING ROOM | 100s |
| OTHER | 10s |

FIG. 18

| RADIO SIGNAL TRANSMITTING TERMINAL ID | MOBILE USER NAME | CATEGORY |
|---|---|---|
| 00:11:22:33:44:A1 | SUZUKI | EMPLOYEE |
| 00:11:22:33:44:A2 | YOSHIDA | VISITOR |

FIG. 19

| RADIO SIGNAL CAPTURING TERMINAL ID | PRESENCE AREA | CATEGORY |
|---|---|---|
| 00:11:22:33:44:11 | MEETING ROOM 101 | MEETING ROOM |
| 00:11:22:33:44:12 | CAFETERIA ON SECOND FLOOR IN SECOND HALL | CAFETERIA |
| 00:11:22:33:44:13 | MEETING ROOM 102 | MEETING ROOM |

FIG. 21

| RADIO SIGNAL TRANSMITTING TERMINAL ID | RADIO SIGNAL CAPTURING TERMINAL ID | REFERENCE RECEPTION LEVEL |
|---|---|---|
| 00:11:22:33:44:A1 | 00:11:22:33:44:01 | -30 |
| 00:11:22:33:44:A1 | 00:11:22:33:44:02 | -20 |
| 00:11:22:33:44:A2 | 00:11:22:33:44:01 | -33 |
| 00:11:22:33:44:A2 | 00:11:22:33:44:02 | -21 |

FIG. 22

| RADIO SIGNAL CAPTURING TERMINAL ID | REFERENCE RECEPTION LEVEL |
|---|---|
| 00:11:22:33:44:01 | -30 |
| 00:11:22:33:44:02 | -20 |

FIG. 23

| RADIO SIGNAL TRANSMITTING TERMINAL ID | RADIO SIGNAL CAPTURING TERMINAL ID | RECEPTION LEVEL | RELATIVE RECEPTION LEVEL | OBTAINING TIME |
|---|---|---|---|---|
| 00:11:22:33:44:A1 | 00:11:22:33:44:01 | -50 | -20 | 2005-11-1-08:01:50:10 |
| 00:11:22:33:44:A1 | 00:11:22:33:44:02 | -40 | -20 | 2005-11-1-08:01:50:10 |
| 00:11:22:33:44:A2 | 00:11:22:33:44:01 | -49 | -16 | 2005-11-1-08:01:50:10 |
| 00:11:22:33:44:A2 | 00:11:22:33:44:02 | -53 | -32 | 2005-11-1-08:01:50:10 |

FIG. 24

| RADIO SIGNAL CAPTURING TERMINAL ID | RECEPTION LEVEL | RELATIVE RECEPTION LEVEL | OBTAINING TIME |
|---|---|---|---|
| 00:11:22:33:44:01 | -50 | -20 | 2005-11-1-08:01:50:10 |
| 00:11:22:33:44:02 | -40 | -20 | 2005-11-1-08:01:50:10 |

| RADIO SIGNAL TRANSMITTING TERMINAL ID | RADIO SIGNAL CAPTURING TERMINAL ID | REFERENCE RECEPTION LEVEL |
|---|---|---|
| 00:11:22:33:44:A1 | 00:11:22:33:44:01 | e(RSSI-10)/5 |
| 00:11:22:33:44:A1 | 00:11:22:33:44:02 | e(RSSI-8)/4 |
| 00:11:22:33:44:A2 | 00:11:22:33:44:01 | e(RSSI-9)/5 |
| 00:11:22:33:44:A2 | 00:11:22:33:44:02 | e(RSSI-7)/4 |

| RADIO SIGNAL CAPTURING TERMINAL ID | REFERENCE RECEPTION LEVEL |
|---|---|
| 00:11:22:33:44:01 | e(RSSI-10)/5 |
| 00:11:22:33:44:02 | e(RSSI-8)/4 |

AREA ESTIMATION SYSTEM, AREA ESTIMATION METHOD AND AREA ESTIMATION APPARATUS

CROSS REFERENCE TO RELATED APPLICATION

The present application is based upon and claims the benefit of priority from the prior Japanese Patent Application No. 2007-210929 filed on Aug. 13, 2007; the entire contents of which are incorporated herein by reference.

BACKGROUND OF THE INVENTION

1. Field of the Invention

The present invention relates to area estimation systems, area estimation methods and area estimation apparatuses.

2. Description of the Related Art

In recent years, an increasing number of corporations have introduced a system called a "free address office." In this system, the users have no fixed seats, and select their seats according to the contents of their tasks or the like.

In such office, there has been a problem of a deterioration in an operation efficiency, since the location (whereabouts) or circumstances of a user is hard to be grasped and thereby discouraging the smooth communication between the users.

In order to solve the above problem, sharing and utilizing presence information, which represents the location (area) and circumstances of a user, has been considered.

The efficiency in the communication and the operation in the office may be improved by a service such as: confirming presence information of other users; providing contact means such as e-mail and telephone in accordance with the presence information of the other users; reminding that a certain user returns to his/her seat; and the like.

In the office, a relationship between the location (area) and circumstances of a user is often fixed as in "a meeting room=in meeting" and "his/her seat=working at his/her desk", and therefore the presence information of a certain user can be estimated by specifying the user's location (area).

An area estimation apparatus has been known as a method for estimating a user's area. In a space equipped with a wireless LAN, the area estimation apparatus learns in advance a radio signal reception level from each access point of the wireless LAN, while the reception level is measured by a wireless LAN device or the like held by a user, and then estimates the user's area by using the learning result, (see "A New Location Detection Method Adopting Learning Algorithms" (NTT, Tomoaki Ogawa, Shuichi Yoshino and Masashi Shimizu, the Institute of Electronics, Information and Communication Engineers, Shingakugihou NS2002-79) and WO2004-008795).

Moreover, another area estimation apparatus has been known which estimates the location of a wireless LAN device held by a user and thus determines the location (area) of the user, by using the radio signal reception level measured at a wireless LAN base station.

BRIEF SUMMARY OF THE INVENTION

However, the area estimation apparatuses according to the foregoing conventional techniques have the following problems.

Namely, the area estimation apparatuses according to the foregoing conventional techniques operate without considering the variations in the radio signal reception levels caused by the movements of surrounding people, objects or the like.

In general, the radio signal reception level varies according to surrounding structural objects, furniture, surrounding people and objects or the like. Since the structural objects, the furniture and the like are hardly moved, the movement thereof do not cause the radio signal reception level to vary from moment to moment. On the other hand, since the people and the objects frequently move, the movements thereof cause the radio signal reception level to vary from moment to moment.

For this reason, it is difficult to estimate an accurate location (area) of a user, even if the radio signal reception level at each area is learnt in advance as is the case with the foregoing conventional techniques. This is because it is highly possible that the radio signal reception level measured at an estimation time widely varies, due to the movements of the people and the objects.

The above-described literatures also describe a fact that the longer the distance between the base station and the location (area) of the user to be estimated, the more remarkable such characteristics.

Moreover, in order to estimate the location (area) of the user, the area estimation apparatuses of the foregoing conventional techniques need to learn in advance the radio signal reception level measured at intervals of about one meter. This requires huge setting costs for estimating location (area) of the user.

In addition, when the location (area) of the user is estimated by using the radio signal reception level measured at the wireless LAN base station, a similar problem is likely to occur. Specifically, as the distance increases between the location (area) of the user and the wireless LAN base station, the radio signal reception level varies more and an error is more likely to occur due to shielding by the people and the objects.

Furthermore, as the estimation result, the location (area) of the user is determined in unit of coordinates (X, Y) or unit area. Therefore, even when a probability of a user's presence is almost same in a plurality of the coordinates or the areas, a coordinate (X,Y) or an area having a maximum probability of the user's presence is required to be determined. Accordingly, the result of the area estimation may vary.

Accordingly, the present invention has been made in view of the above problems, and an object thereof is to provide an area estimation system, an area estimation method, and an area estimation apparatus, which allow a location (area) of a user to be estimated with a spatial width where a high reliability (confidence factor) can be maintained in accordance with an obtained radio signal reception level without learning radio signal reception levels in advances even in an environment where the radio signal reception level frequently varies due to the movements of surrounding people and objects.

SUMMARY OF THE INVENTION

A first aspect of the present invention is summarized as an area estimation system, including: a radio signal transmitting terminal configured to transmit a radio signal to a certain radio signal receiving terminal via a network, with a presence area of the radio signal transmitting terminal being unknown; a plurality of radio signal capturing terminals configured to capture the radio signal transmitted from the radio signal transmitting terminal, and to measure a radio signal reception level, with a presence area of the radio signal capturing terminals being known; a reception level receiving unit configured to receive, from each of the radio signal capturing terminals via the network, the measured radio signal reception level, a radio signal transmitting terminal ID for uniquely identifying the radio signal transmitting terminal, and a radio signal capturing terminal ID for uniquely identifying each of the plurality of the radio signal capturing terminals; a reception level storage unit configured to store the measured radio signal reception level, the radio signal transmitting terminal ID and the radio signal capturing terminal ID, which are received from each of the radio signal capturing terminals, in association with one another; and a presence area estimating unit configured to refer to the reception level storage unit and to estimate the presence area of the radio signal transmitting terminal, by using at least one presence area of at least one radio signal capturing terminal identified by at least one radio signal capturing terminal ID associated with a predetermined range of at least one radio signal reception level stored in the reception level storage unit.

According to this invention, the plurality of the radio capturing terminal receives the radio signal transmitted from the radio signal transmitting terminal whose, presence area is to be estimated, to the radio signal receiving terminal, and measures the radio signal reception level. Then, the area estimation apparatus compares the radio signal reception level measured by each of the radio signal capturing terminals and determines the presence area of the at least radio signal capturing terminal which is determined as existing near the radio signal transmitting terminal, as the presence area of the radio signal transmitting terminal. As a result, in an environment where the radio signal reception level frequently varies due to the movements of surrounding people and objects, at least one radio signal capturing terminal can estimate the presence area of the radio signal transmitting terminal without learning radio signal reception levels in advance, although the spatial width is to some extent large.

In the first aspect of the present invention, the presence area candidate estimating unit may be configured to refer to the reception level storage unit and to specify, as a presence area candidate of the radio signal transmitting terminal, the at least one presence area of the at least one radio signal capturing terminal identified by the at least one radio signal capturing terminal ID associated with the predetermined range of the at least one radio signal reception level; and a presence area candidate narrowing unit may be configured to estimate the presence area of the radio signal transmitting terminal, from the presence area candidate of the radio signal transmitting terminal, on the basis of a confidence factor calculated based on the radio signal reception level.

According to this invention, it is possible to roughly specify the radio signal capturing terminal which may exist near the radio signal transmitting terminal, based on the radio signal reception level. Then, the presence area candidate narrowing unit introduce the parameter of confidence factor. This makes it possible to properly narrow the at least one presence area of the radio signal transmitting terminal, from the presence area candidate of the radio signal transmitting terminal.

In the first aspect of the present invention, the presence area candidate estimating unit may be configured to refer to the reception level storage unit and to specify, as the presence area candidate of the radio signal transmitting terminal, at least one presence area of at least one radio signal capturing terminal which corresponds to a radio signal reception level having a value not less than a value obtained by subtracting a predetermined threshold value from a maximum value of the reception level.

According to this invention, the presence area candidate estimating unit can properly specify the presence area of the radio signal capturing terminal which exists near the radio signal transmitting terminal, based on the attenuation property of the radio signal reception level.

In the first aspect of the present invention, when a plurality of the radio signal capturing terminals identified by the at least one radio signal capturing terminal ID associated with the predetermined range of the at least one radio signal reception level are present in each of an area, the presence area candidate estimating unit may be is configured to specify, as a representative radio signal capturing terminal in each of the area, a radio signal capturing terminal associated with a radio signal reception level having a largest value, and the presence area candidate narrowing unit is configured to estimate the presence area of the radio signal transmitting terminal by using a radio signal reception level associated with the representative radio signal capturing terminal.

This invention makes it possible to solve the problem that, the confidence factor is high in an area in which the number of existing radio signal capturing terminal is large, in the process at the presence area candidate narrowing unit, when the number of the radio signal capturing terminal existing in each area is different.

In the first aspect of the invention, the presence area candidate narrowing unit may be configured to calculate the confidence factor by using a relative ratio of the radio signal reception level associated with the representative radio signal capturing terminal, and to estimate, as the presence area of the radio signal transmitting terminal, at least one presence area of at least one radio signal capturing terminal having a total sum of the confidence factor being no less than a predetermined threshold value.

According to this invention, the presence area candidate narrowing unit determines the confidence factor by using the relative ratio of the radio signal level associated with the representative radio signal capturing terminal. Accordingly, the confidence factor can be appropriately specified in consideration of the attenuation properties of the reception levels.

Moreover, according to the area estimation system of this embodiment, the confidence factor is changed in the range of 0% to 100% when the aforementioned relative ratio of the reception levels is used. Accordingly, the threshold of the confidence factor required by the user can be easily designated.

Furthermore, based on the relative ratio of the radio signal reception levels to the radio signal capturing terminals, it is possible to calculate, in each area, the confidence factor indicating a possibility that the radio signal transmitting terminal exists near the representative radio signal capturing terminal. Then, by specifying the presence areas of the group of the radio signal capturing terminals which satisfy the threshold calculated in connection with the confidence factor, the estimation can be performed while satisfying the calculated confidence factor.

The first aspect of this invention may further include a time managing unit configured to obtain time information indicating a time when each of the radio signal capturing terminals captures the radio signal, and the reception level storage unit may be configured to store the radio signal reception level, the radio signal transmitting terminal ID, the radio signal capturing terminal ID, which are received from each of the radio signal capturing terminals, and the time information, which is obtained by the time managing unit, in association with one another.

This aspect of the present invention makes it possible to estimate the presence area of the radio signal transmitting terminal based on the time information.

In the first aspect of this invention, the presence area estimating unit may be configured to estimate the presence area of the radio signal transmitting terminal in consideration of a past radio signal reception level measured by the radio signal capturing terminals.

According to this invention, the presence area of the radio signal transmitting terminal with the maximum value of the reception level is specified by using the past radio signal reception level (past record). This makes it possible to estimate the presence area of the radio signal transmitting terminal having a resistance to the temporal fluctuation of the radio signal due to the movement of the people, object or the like.

In the first aspect of this invention, the presence area estimating unit may be configured to estimate the presence area of the radio signal transmitting terminal by using a latest radio signal reception level measured by the radio signal capturing terminals.

This makes it possible to estimate the presence area of the radio signal transmitting terminal based on the latest radio signal reception level at any time, and to specify the latest presence area of the radio signal transmitting terminal.

In the first aspect of this invention, the presence area estimating unit may be configured to estimate the presence area of the radio signal transmitting terminal by using a radio signal reception level measured at the same time as or a nearest time to a time when the certain radio signal receiving terminal receives the radio signal.

The first aspect of this invention may further comprise an area estimation frequency determining unit configured to determine a frequency of the area estimation based on the presence area of the radio signal transmitting terminal, or attribute information of the radio signal transmitting terminal.

According to this invention, the area estimation frequency can be appropriately specified based on the presence area of the radio signal transmitting terminal or the attribute information of the radio signal transmitting terminal. This makes it possible to estimate the area with the frequency as required, thus allowing a reduction in the network traffic, in the load on the system and in the power consumption.

The first aspect of the invention may further comprising a staying-moving judgment unit configured to judge whether the radio signal transmitting terminal is staying in an area or moving between areas, by using a past record of the radio signal reception level stored in the reception level storage unit, or a past record of the presence area of the radio signal transmitting terminal.

This aspect of the invention makes it possible to perform the estimation whether the radio signal transmitting terminal is "staying in the area" or "moving between the areas", besides the estimation of the presence area of the radio signal transmitting terminal.

The first aspect of the invention may further include a reception level-record-use number determination unit configured to determine the number of the past record of the stored radio signal reception level based on the judgment result of the staying-moving judgment unit, and the area estimation frequency determining unit may be configured to determine the frequency of the area estimation on the radio signal transmitting terminal, based on the judgment result of the staying-moving judgment unit.

According to this aspect of the present invention, it is possible to appropriately determine the number of the past records of the radio signal reception levels to be used, based on whether the radio signal transmitting terminal is "staying in an area" or "moving between areas."

Specifically, when the radio signal transmitting terminal is staying in an area, the number of the past records of the radio signal reception levels to be used is set large. This makes it possible to accommodate an estimation error attributable to the temporal fluctuation of the radio signal reception level and to improve the confidence factor.

On the other hand, when the radio signal transmitting terminal is moving between areas, the number of the past records of the radio signal reception levels to be used is set small. This makes it possible to appropriately estimate the presence area of the radio signal transmitting terminal that is changing from one to another every moment.

Moreover, based on whether the radio signal transmitting terminal is "moving between areas" or "staying in an area", the estimation frequency can be determined appropriately.

Specifically, when the radio signal transmitting terminal is staying in an area, the area estimation frequency is set large, thus allowing in a reduction in the network traffic, in the load on the system and in the power consumption.

On the other hand, when the radio signal transmitting terminal is moving between areas, the area estimation frequency is set small, and thereby the presence area can be estimated in real time.

The first aspect of the present invention may further include an area estimation frequency storage unit configured to store at least any one of the attribute information of the radio signal transmitting terminal, attribute information of each of the radio signal capturing terminals, and the frequency of the area estimation, and the area estimation frequency determining unit may be configured to determine the frequency of the area estimation based on at lease any one of the attribute information of the radio signal transmitting terminal, the attribute information of the radio signal capturing terminals, and the frequency of the area estimation, which are stored in the area estimation frequency storage unit.

According to this aspect of the invention, the area estimation can be performed at the minimum required frequency in accordance with the attribute information of the radio signal transmitting terminal or the presence area of the radio signal transmitting terminal. Therefore, the network traffic and the load on the system can be reduced.

The first aspect of the present invention may further include a relative reception level determining unit configured to refer to the past record of the radio signal reception level stored in the reception level storage unit, to determine a reference reception level for a combination of the radio signal transmitting terminal and each of the radio signal capturing terminals, or for the radio signal transmitting terminal, to store the determined reference reception level in a reference reception level storage unit, and to determine, as a relative reception level, a difference between each of the radio signal reception level measured by each of the radio signal capturing terminals, and the reference reception level, and the presence area estimating unit may be configured to estimate the presence area of the radio signal transmitting terminal by using the relative reception level.

According to this aspect of the present invention, in order to solve a problem that the obtained radio signal reception levels frequently varies due to the individual differences in the hardware which constitute the radio signal capturing units, this aspect of the present invention determines the reference reception level for the combination of the each [radio signal transmitting terminal ID, radio signal capturing terminal ID], or for the each radio signal capturing terminals and utilize the variation amount between the reference reception level and the obtained reception level, thereby making it possible to neutralize the individual differences without performing a complicated calibration or the like.

The first aspect of the present invention may further include a channel switching unit configured to instruct the radio signal capturing terminals to perform a detection on a plurality of channels by switching from one channel to another at certain intervals, when the plurality of the channels are used for transmitting the radio signal between the radio signal transmitting terminal and the certain radio signal receiving terminal, and the radio signal capturing terminals may be configured to capture the radio signal transmitted via the plurality of channels and to measure the radio signal reception level on the plurality of channels, and the presence area estimating unit may be configured to estimate the presence area of the radio signal transmitting terminal based on the radio signal reception level on the plurality of channels.

According to this embodiment of the present invention, it is possible to properly estimate the presence area of the radio signal transmitting terminal, by switching the channels for communication at certain intervals and by measuring the radio signal reception levels respectively, even when a plurality of base stations (access points) using different channels exist and where the communication areas of the base stations (access points) overlap one another.

In the first aspect of the invention, the radio signal capturing terminals may be configured to obtain a usage state of an available channel on which a communication can be made, to capture the radio signal by switching only channels being in use, from one channel to another at certain intervals, and to measure the radio signal reception level on the plurality of channels.

According to this invention of the present invention, even when the plurality of available channels exist, the usage state of the channels is checked and radio signal reception levels are obtained by dividing only the respective channels actually being in use at the certain intervals. Accordingly, it is possible to eliminate an unnecessary channel switching, and thereby to estimate the presence area of the radio signal transmission terminal in real time.

A second aspect of the present invention is summarized as an area estimation method for estimating a presence area of a radio signal transmitting terminal by using a plurality of radio signal capturing terminals, with the presence area of the radio signal capturing terminals being known, including: transmitting, at the radio signal transmitting terminal, a radio signal to a certain radio signal receiving terminal via a network; capturing, at the radio signal capturing terminals, the radio signal transmitted from the radio signal transmitting terminal, measuring, at each of the radio signal capturing terminals, a radio signal reception level; receiving, from each of the radio signal capturing terminals via the network, the measured radio signal reception level, a radio signal transmitting terminal ID for uniquely identifying the radio signal transmitting terminal, and a radio signal capturing terminal ID for uniquely identifying each of the plurality of radio signal capturing terminals; storing the measured radio signal reception level, the radio signal transmitting terminal ID, and the radio signal capturing terminal ID, which are received from each of the radio signal capturing terminals, in association with one another; and estimating the presence area of the radio signal transmitting terminal, by using at least one presence area of at least one radio signal capturing terminal identified by at least one radio signal capturing terminal ID associated with a predetermined range of at least one radio signal reception level.

A third aspect of the present invention is summarized as an area estimation apparatus for estimating a presence area of a radio signal transmitting terminal which transmits a radio signal to a certain radio signal receiving terminal via a network, including: a reception level receiving unit configured to receive, from each of a plurality of radio signal capturing terminals via the network, a radio signal reception level transmitted from the radio signal transmitting terminal, a radio signal transmitting terminal ID for uniquely identifying the radio signal transmitting terminal, and a radio signal capturing terminal ID for uniquely identifying each of the plurality of radio signal capturing terminals; with a presence area of the radio signal capturing terminals being known; a reception level storage unit configured to store the radio signal reception level, the radio signal transmitting terminal ID and the radio signal capturing terminal ID, which are received from each of the radio signal capturing terminals, in association with one another; and a presence area estimating unit configured to refer to the reception level storage unit and to estimate the presence area of the radio signal transmitting terminal, by using at least one presence area of at least one radio signal capturing terminal identified by at least one radio signal capturing terminal ID associated with a predetermined range of at least one radio signal reception level.

BRIEF DESCRIPTION OF THE DRAWINGS

FIGS. 4A and 4B show examples of information stored in a radio signal transmitting terminal attribute information storage unit and an area estimation attribute information storage unit according to the first embodiment of the present invention;

FIG. 5 shows an example of information stored in a reception level storage unit according to the first embodiment of the present invention;

FIG. 8 is a view explaining an area estimation method according to the first embodiment of the present invention;

FIG. 9 is a view explaining an area estimation method according to the first embodiment of the present invention;

FIG. 10 is a view showing an example of information stored in a radio signal transmitting terminal presence area storage unit according to the first embodiment of the present invention;

FIG. 12 is a view showing an example of information stored in a radio signal transmitting terminal attribute information storage unit according to the modified example of the first embodiment of the present invention;

FIG. 13 is a view showing an example of information stored in a radio signal capturing terminal attribute information storage unit according to the modified example of the first embodiment of the present invention;

FIGS. 17A and 17B are views showing examples of information stored in an area estimation frequency storage unit according to the third embodiment of the present invention;

FIG. 18 is a view showing an example of information stored in a radio signal transmitting terminal attribute information storage unit according to the third embodiment of the present invention;

FIG. 19 is a view showing an example of information stored in a radio signal capturing terminal attribute information storage unit according to the third embodiment of the present invention;

FIG. 21 is a view showing an example of information stored in a reference reception level storage unit according to the fourth embodiment of the present invention;

FIG. 22 is a view showing an example of information stored in the reference reception level storage unit according to the fourth embodiment of the present invention;

FIG. 23 is a view showing an example of information stored in the reception level storage unit according to the fourth embodiment of the present invention;

FIG. 24 is a view showing an example of information stored in the reception level storage unit according to the fourth embodiment of the present invention;

DETAILED DESCRIPTION OF THE INVENTION

Figure 1:
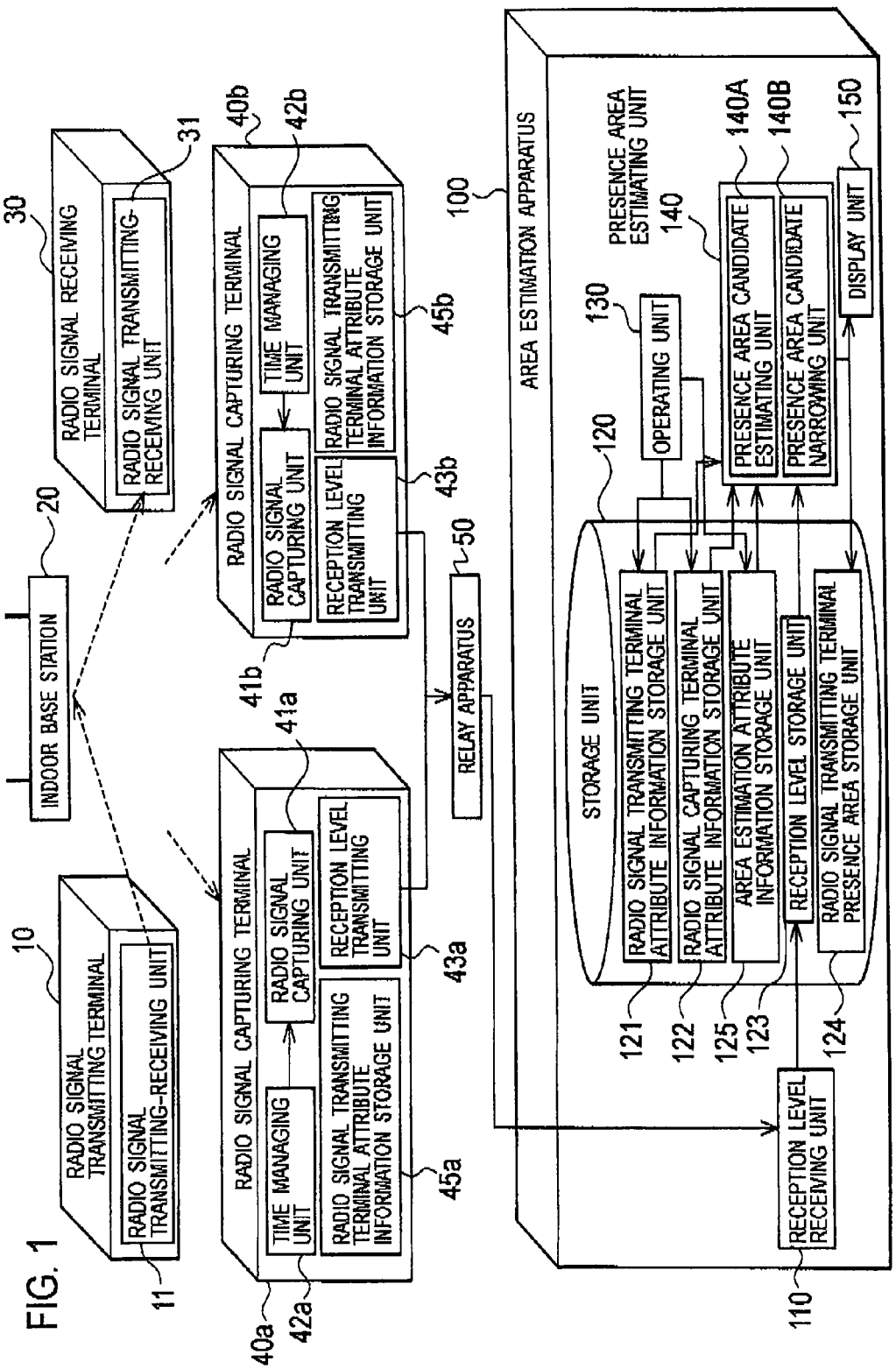
FIG. 1 is an entire configuration view of an area estimation system according to a first embodiment of the present invention.

Next, with reference to the accompanying drawings, embodiments of the present invention will be described. In the description of the drawings, the same or similar reference numerals denote the same or similar elements. However, it should be noted that the drawings are schematic.

First Embodiment

Area Estimation System

As shown in FIG. 1, an area estimation system according to a first embodiment of the present invention includes a radio signal transmitting terminal 10, an indoor base station 20, a radio signal receiving terminal 30, radio signal capturing terminals 40a, 40b, a relay apparatus 50 and an area estimation apparatus 100.

The radio signal transmitting terminal 10 includes a radio signal transmitting-receiving unit 11. The radio signal transmitting-receiving unit 11 is configured to transmit a radio signal to the radio signal receiving terminal 30.

The radio signal transmitting terminal 10 can serve as a mobile phone, PDA (Personal Digital Assistants), a laptop, or the like, which is always carried by a user. Further, the radio signal transmitting terminal 10 includes a wireless LAN adaptor.

The radio signal receiving terminal 30 includes a radio signal transmitting-receiving unit 31. The radio signal transmitting-receiving unit 31 is configured to receive a radio signal transmitted from the radio signal transmitting terminal 10.

The radio signal receiving terminal 30 is physically configured of a computer and a wireless LAN adaptor connected to the computer. It should be noted that the radio signal receiving terminal 30 can additionally serve as radio signal capturing terminals 40a and 40b or a main body of the area estimation apparatus 100.

The radio signal capturing terminals 40a and 40b respectively include radio signal capturing units 41a and 41b, time managing units 42a and 42b, reception level transmitting units 43a and 43b, and radio signal transmitting terminal attribute information storage units 45a and 45b. It should be noted that the number of the radio signal capturing units are not limited to 2, and more than 2 radio signal capturing units may be employed.

Each of the radio signal capturing terminals 40a and 40b is physically configured of a computer and a wireless LAN adaptor connected to the computer.

Each of the radio signal capturing units 41a and 41b is configured to capture a radio signal transmitted from the radio signal transmitting terminal 10 to the radio signal receiving terminal 30, to obtain a radio signal transmitting terminal ID for uniquely identifying the radio signal transmitting terminal 10, and to measure a radio signal reception level.

The time managing units 42a and 42b are respectively configured to obtain the current time information in response to the requests from the radio signal capturing units 41a and 41b, and to return the information to the radio signal capturing units 41a and 41b.

Here, the time managing units 42a and 42b may be configured to obtain the current time information by executing a program which periodically synchronizes time between the computers. Alternatively, the time managing units 42a and 42b may be configured to obtain the current time information from NTP (Network Time Protocol) server or the like.

The reception level transmitting units 43a and 43b are configured to transmit, to the area estimation apparatus 100; the radio signal transmitting terminal ID obtained by the radio signal capturing units 41a and 41b; radio signal capturing terminals ID for uniquely identifying the radio signal capturing terminals 40a and 40b; the radio signal reception level measured as mentioned above, and time information (obtaining time) representing the time at which the reception level is obtained.

For example, an MAC address or the like assigned to the wireless LAN adaptor is assumed to be used as the radio signal transmitting terminal ID and the radio signal capturing terminal ID.

Moreover, a laptop, a desktop personal computer, or the like which hardly moves, is assumed to be used as the radio signal capturing terminals 40a, 40b.

The radio signal transmitting terminal attribute information storage units 45a and 45b are configured to store a combination including two data items (a radio signal transmitting terminal ID and a mobile user name).

Here, the mobile user name indicates a name of a user carrying a radio signal transmitting terminal 10.

Note that, as will be described later, when the radio signal capturing terminals 40a and 40b perform a processing for extracting a desired packet, the attribute information of the radio signal transmitting terminal 10 is stored in the radio signal transmitting terminal attribute information storage units 45a and 45b.

The indoor base station 20 is physically configured of a wireless access point. The indoor base station 20 is configured to relay the radio signal transmitted from the radio signal transmitting terminal 10 and to transmit the radio signal to the radio signal receiving terminal 30.

The relay apparatus 50 is physically configured of a hub or a router. The relay apparatus 50 is configured to relay, to the area estimation apparatus 100, the radio signal transmitting terminal ID, the radio signal capturing terminal ID, the reception level and the obtaining time, which are transmitted from the reception level transmitting units 43a and 43b as mentioned above.

The area estimation apparatus 100 includes a reception level receiving unit 110, a storage unit 120, an operating unit 130, a presence area estimating unit 140 and a display unit 150.

The area estimation apparatus 100 is physically configured of a computer and a wired or wireless LAN adaptor connected to the computer.

The storage unit 120 includes a radio signal transmitting terminal attribute information storage unit 121, a radio signal capturing terminal attribute information storage unit 122, a reception level storage unit 123, a radio signal transmitting terminal presence area storage unit 124 and an area estimation attribute information storage unit 125.

Note that the storage unit 120 may be configured of an internal memory device such as RAM or the like, or may be configured of an external memory device such as a hard disk, a flexible disc, or the like.

The reception level receiving unit 110 is configured to receive "radio signal transmitting terminal ID", "radio signal capturing terminal ID", "reception level" and "obtaining time", which are transmitted from the reception level transmitting units 43a and 43b as mentioned above, and to store them in the reception level storage unit 123.

As shown in FIG. 4A, the radio signal transmitting terminal attribute information storage unit 121 is configured to store the combination including the two data items (a radio signal transmitting terminal ID and a mobile user name).

Here, the mobile user name indicates a name of a user carrying the radio signal transmitting terminal 10.

Figures 2, 3:
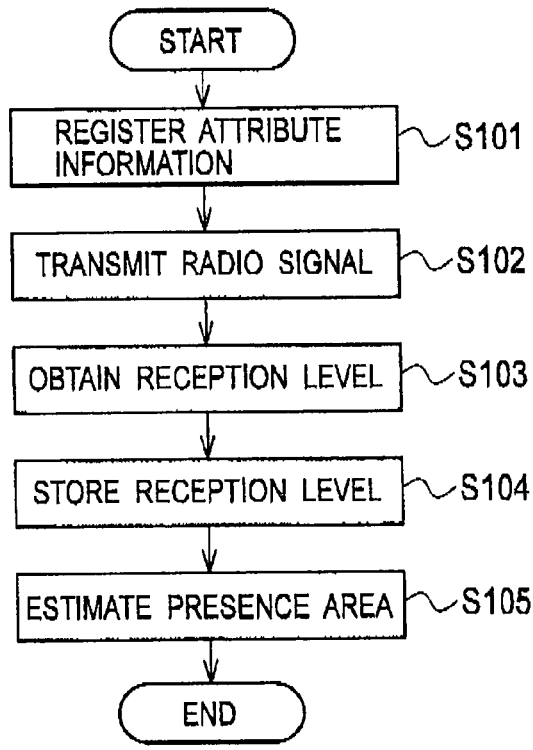
FIG. 2 is a flowchart showing an area estimation method according to the first embodiment of the present invention.
FIG. 3 is a view showing an example of information stored in a radio signal capturing terminal attribute information storage unit according to the first embodiment of the present invention.

The radio signal capturing terminal attribute information storage unit 122 is configured to store the combination including two data items (a radio signal capturing terminal ID and a presence area) as shown in FIG. 3. Here, a name of an area (location) such as, for example, "Yamada's seat" or "Suzuki's seat" is stored as "presence area."

The reception level storage unit 123 is configured to store a combination including four data items (a radio signal transmitting terminal ID, a radio signal capturing terminal ID, a reception level, obtaining time) as shown in FIG. 5.

The radio signal transmitting terminal presence area storage unit 124 is configured to store a combination of three data items (a radio signal transmitting terminal ID, a presence area, an estimation time (obtaining time)) as shown in FIG. 10.

The area estimation attribute information storage unit 125 is configured to store a reception level aggregation method, a threshold Rc which specifies the group of the radio signal capturing terminals existing near the radio signal transmitting terminal 10, and a confidence factor threshold Pc as shown in FIG. 4B.

The operating unit 130 is configured to input information to be stored in any of the radio signal transmitting terminal attribute information storage unit 121, the radio signal capturing terminal attribute information storage unit 122, and the area estimation attribute information storage unit 125.

For example, an administrator or the like can input, by using the operating unit 130, the "presence area" to be stored in the radio signal capturing terminal attribute information storage unit 122 and the "user name" to be stored in the radio signal transmitting terminal attribute information storage unit 121. A keyboard or a mouse is assumed to be used as the operating unit 130.

The presence area estimating unit 140 is configured to refer to the reception level storage unit 123, and to estimate a presence area of the radio signal transmitting terminal 10, by using at least one presence area of at least radio signal capturing terminals 40a and 40b identified by the "radio signal capturing terminal ID" which is associated with a predetermined range of at least one radio signal reception level stored in the reception level storage unit 123.

To be more specific, the presence area estimating unit 140 includes a presence area candidate estimating unit 140A and a presence area candidate narrowing unit 140B The presence area candidate estimating unit 140A is configured to refer to the reception level storage unit 123, and to specify, as a presence area candidate of the radio signal transmitting terminal 10, the at least one presence area of the at least radio signal capturing terminals 40a and 40b identified by the "radio signal capturing terminal ID" associated with the predetermined range of the at least one radio signal the reception level.

To be more specific, the presence area candidate estimating unit 140A is configured to obtain, from the reception level storage unit 123 at a regular time interval, the at least one reception level, which is transmitted from the radio signal transmitting terminal 10 and obtained by at least one the radio signal capturing terminals 40a and 40b.

When the presence area candidate estimating unit 140A obtains a plurality of the reception level, the presence area candidate estimating unit 140A specifies the presence area candidate of the radio signal transmitting terminal 10 by using an average value of the plurality of the reception level, a median value thereof or the maximum value thereof.

Here, the median value refers to a value which comes in middle when a plurality of data items are arranged in ascending order (note that, if the number of the data items is even, the median value is the average value of the two middle values).

Incidentally, based on a set value (a reception level aggregation method) stored in the area estimation attribute information storage unit 125, the presence area candidate estimating unit 140A determines a value to be used for specifying a presence area candidate of the radio signal transmitting terminal 10 (the group of the radio signal capturing terminal existing near the radio signal transmitting terminal 10), from the average value, the median value or the maximum value.

To be more specific, the presence area candidate estimating unit 140A regards, as a group of the radio signal capturing terminals existing near the radio signal transmitting, a group of the radio signal capturing terminals which obtains an RSSI having a value within a predetermined range equal to or less than a maximum value. "RSSI" (Receiver Signal Strength Indicators) indicates the reception level.

Here, it is assumed that a radio signal capturing terminal ID, which identifies a $j^{th}$ radio signal capturing terminal existed in an area m, is given by the following expression:

$$a_j^m$$

Further, it is assumed that the RSSI (reception level) associated with the radio signal capturing terminal ID is given by the following expression:

$$R(a_j^m)$$

Then, it is assumed that the maximum value of the RSSIs associated with all the radio signal capturing terminal ID is indicated as "Rmax", and the radio signal capturing terminal ID, which is included in the group of the radio signal capturing terminals existing near the radio signal transmitting terminal 10, is expressed in the following expression:

$$IN,$$

Here, the radio signal capturing terminal ID can be expressed by using the following equation (1).

$$IN=\{a_j^m | R(a_j^m) \geq Rmax-Rc\} \qquad \text{equation (1)}$$

Note that "Rc" is stored in the area estimation attribute information storage unit 125 and indicates a threshold for specifying the group of the radio signal capturing terminals existing near the radio signal transmitting terminal 10.

Then, the presence area candidate estimating unit 140A obtains, from the radio signal capturing terminal attribute information storage unit 122, a group of the presence areas of the radio signal capturing terminals. The presence areas are respectively associated with the radio signal capturing terminal ID included in the group of the radio signal capturing terminals existing near the radio signal transmitting terminal 10. When the plurality of radio signal capturing terminals exist in each of the presence area, the presence area candidate estimating unit 140A specifies a representative radio signal capturing terminal.

When the presence area is indicated by "m'", it is highly possible that, in each of the presence area m', the radio signal capturing terminal identified by the radio signal capturing terminal ID associated with the maximum value of the RSSI will be the nearest to the radio signal transmitting terminal 10. Therefore, the presence area candidate estimating unit 140A regards the above-described radio signal capturing terminal to be a representative radio signal capturing terminal "ha$^{m'}$", in each of the presence area m'. Accordingly, the presence area candidate estimating unit 140A transmits "m'" and "ha$^{m'}$" to the presence area candidate narrowing unit 140B.

The presence area candidate narrowing unit 140B is configured to estimate the presence area of the radio signal transmitting terminal 10, from the presence area candidate of the radio signal transmitting terminal 10, on the basis of a confidence factor calculated based on the aforementioned radio signal reception level.

Specifically, the presence area candidate narrowing unit 140B receives, from the presence area candidate estimating unit 140A, "m'", which is the presence area candidate of the radio signal transmitting terminal 10, and "ha$^{m'}$", which is the radio signal capturing terminal ID for identifying the representative radio signal capturing terminal.

Then, in order to specify a confidence factor P (m'), which indicates the confidence factor of the presence of the radio signal transmitting terminal 10, the presence area candidate narrowing unit 140B calculates, for each of the presence area m', the relative magnitude of the reception level R ("ha$^{m'}$") associated with the representative radio signal capturing terminal ID ha$^{m'}$, based on the relative ratio.

Here, it should be noted that the confidence factor P (m') calculated by means of the aforementioned relative ratio does not represent the confidence factor (reliability) of the area estimation result itself. Instead, the confidence factor P (m') represents a relative confidence factor (reliability) of the result in which the presence area of the radio signal transmitting terminal 10 is the presence area m', as compared with the result in which the presence area of the radio signal transmitting terminal 10 is the other area.

The confidence factor P (m') is calculated by using an equation (2). Note that K represents the number of areas included in the presence area candidates of the radio signal transmitting terminal 10.

$$p(m)' = \frac{R(ha^{m'})}{\sum_{k=1}^{k} R(ha^k)} \times 100 \qquad \text{equation (2)}$$

Finally, the presence area candidate narrowing unit 140B sorts the confidence factor P (m') in descending order, and specifies a minimum presence area in which the radio signal capturing terminal having the confidence factor no less than the threshold Pc.

Here, the presence area candidate narrowing unit 140B stores, in the radio signal transmitting terminal presence area storage unit 124, the radio signal transmitting terminal ID and the latest time in the period of time in which the specification is carried out (hereinafter referred to as "estimation time"), in association with one another.

Thus, when a plurality of the radio signal capturing units 41a and 42b capture the radio signal transmitted from the radio signal transmitting terminal 10, the presence area estimating unit 140 estimates, as the presence area of the radio signal transmitting terminal 10, the presence area of the radio signal capturing terminal having the highest confidence factor, in consideration of the plurality of reception levels including the past radio signal reception levels (past records).

Moreover, the presence area estimating unit 140 may estimate the presence area of the radio signal transmitting terminal 10 by using the latest radio signal reception levels obtained by the radio signal capturing units 41a and 41b instead of the past radio signal reception levels (past records).

The display unit 150 is configured to display the estimation time and the presence area of the radio signal transmitting terminal 10, which is estimated by the presence area estimating unit 140.

Here, a screen of a monitor or the like is assumed to be used as the display unit 150. For example, a liquid crystal display device (LCD), a light-emitting diode (LED) panel or an electroluminescence (EL) panel can be used.

(Area Estimation Method)

Sequentially, an explanation will be given of an area estimation method of the present embodiment with reference to FIG. 2.

Firstly in step S101, an administrator registers various attribute information in order to operate the area estimation apparatus 100 of the present embodiment. (S101).

To be more specific, the administrator registers the MAC addresses (radio signal capturing terminal ID) and the presence areas respectively of the radio signal capturing terminals 40a and 40b in the radio signal capturing terminal attribute information storage unit 122 via the operating unit 130. FIG. 3 shows an example of the attribute information of the radio signal capturing terminal, which is stored in the radio signal capturing terminal attribute information storage unit 122.

Moreover, the administrator registers the MAC address (radio signal transmitting terminal ID) and the mobile user name respectively of the radio signal transmitting terminal 10, in the radio signal transmitting terminal attribute information storage unit 121 via the operating unit 130. FIG. 4 shows an example of the attribute information of the radio signal transmitting terminal stored in the radio signal transmitting terminal attribute information storage unit 121.

Further, the administrator registers, in the area estimation attribute information storage unit 125 via the operating unit 130, the reception level aggregation method, the threshold Rc, and the confidence factor threshold Pc. FIG. 4B shows an example of the information stored in the area estimation attribute information storage unit 125.

When the radio signal capturing terminals 40a and 40b perform the later-described processing for extracting a desired packet, the attribute information of the radio signal transmitting terminal registered above is also registered in each of the radio signal transmitting terminal attribute information storage units 45a and 45b of the radio signal capturing terminals 40a and 40b, in response to a trigger event in which the radio signal transmitting terminal attribute information is registered in radio signal transmitting terminal attribute information storage unit 121.

In step S102, the radio signal transmitting terminal 10 transmits a radio signal to the radio signal receiving terminal 30.

Specifically, the radio signal transmitting terminal 10 transmits an ICMP Echo Request packet (radio signal) to the radio signal receiving terminal 30.

Here, the area estimation apparatus 100 or the radio signal capturing terminals 40a and 40b may additionally serve as the radio signal receiving terminal 30.

Furthermore, the radio signal transmitting terminal 10 may be configured to periodically (such as every one second) transmit the ICMP Echo Request packet, for example. Alternatively, the ICMP Echo Request packet may be transmitted in response to an explicit operation such as when a button is pressed by a user.

In step S103, the radio signal capturing terminals 40a and 40b capture the ICMP Echo Request packet transmitted from the radio signal transmitting terminal 10, and obtain packet information included in the ICMP Echo Request packet and the reception level of the ICMP Echo Request packet.

The radio signal capturing terminals 40a and 40b can obtain the aforementioned reception level by accessing a device driver of a wireless LAN card.

Furthermore, when "Windows (registered trademark)" is used, the radio signal capturing terminals 40a and 40b can obtain the aforementioned reception level by using a function such as "DeviceIoControl" with respect to an NDIS-compatible wireless LAN card.

Furthermore, when "Linux" is used, the radio signal capturing terminals 40a and 40b can obtain the aforementioned reception level by reading a concerned file in the "Procfile-system."

Here, on the wireless network, packets other than the ICMP Echo Request packet are transmitted from the radio signal transmitting terminal 10. Therefore, it is required to extract a desired packet from the captured packets.

This extracting processing may be performed by the area estimation apparatus 100, or by the radio signal capturing terminals.

The following will describe based on an example when the radio signal capturing terminals 40a and 40b perform the extracting processing.

In an infrastructure mode, requirements for a packet to be extracted are that, in an IP layer, the IP address of a packet transmitting terminal and the IP address of a packet destination terminal respectively are the IP address of the radio signal transmitting terminal 10 and the IP address of the radio signal receiving terminal 30, and that, in a MAC layer, the MAC address of the packet transmitting terminal and the MAC address of the packet destination terminal respectively are the MAC address of the radio signal transmitting terminal 10 and the MAC address of the access point.

On the other hand, in an ad hoc mode, requirements for a packet to be extracted are that, in the MAC layer, the MAC address of a packet transmitting terminal and the MAC address of a packet destination terminal respectively are the MAC address of the radio signal transmitting terminal 10 and the MAC address of the radio signal receiving terminal 30.

Although it suffices that the processing for extracting only a desired packet from the packet information be performed on packets outputted from the device driver, it is more desirable to perform this extracting processing in the device driver.

However, if the number of the radio signal transmitting terminals is enormous, it is difficult to hold all the necessary information in the device driver.

In such case, it is desirable to firstly extract packets by using the MAC addresses of destination terminals, and then to extract packets by using the MAC addresses of transmitting terminals, in the device driver.

In step S104, the area estimation apparatus 100 stores the reception level obtained from the radio signal capturing terminals 40a and 40b.

Specifically, the radio signal capturing terminals 40a and 40b transmits, to the area estimation apparatus 100 via a wired network, the time when the reception level is obtained, the MAC address for uniquely identifying the own radio signal capturing terminals 40a and 40b, the radio signal transmitting terminal ID and the reception level of the ICMP Echo Request packet, in association with one another. Here, the radio signal transmitting terminal ID and the reception level of the ICMP Echo Request packet are captured by the radio signal capturing units 41a and 41b, and the obtaining time, which indicates the time when the reception level is obtained, is obtained by the time managing units 42a and 42b.

The reception level receiving unit 110 receives the radio signal transmitting terminal ID, the radio signal capturing terminal ID, the reception level, and the obtaining time, so as to store the aforementioned data items in the reception level storage unit 123.

When the area estimation apparatus 100 performs the foregoing processing for extracting a desired packet, it should be performed before the reception level storage unit 123 stores these data items.

FIG. 5 shows an example of the reception level information stored in the reception level storage unit 123.

In step S105, the area estimation apparatus 100 estimates the presence area of the radio signal transmitting terminal 10 using the obtained reception level.

To be more specific, the presence area candidate estimating unit 140A obtains, from the reception level storage unit 123, the reception levels which are measured by the radio signal capturing terminals 40a and 40b in the last N seconds before the current time. The obtaining process is carried out either periodically, or in response to a triggered event in which the information on a new reception level is stored in the reception level storage unit 123.

Here, N is set such that each of the radio signal capturing terminals 40a and 40b can obtain at least one reception level.

When a plurality of the reception levels of a certain radio signal capturing terminal are obtained, the presence area candidate estimating unit 140A obtains the reception level aggregation method from the area estimation attribute information storage unit 125. Then the presence area candidate estimating unit 140A calculates any one of the average value, the median value and the maximum value based on the obtained reception level aggregation method, and uses the calculation result as the reception level of the radio signal capturing terminal.

Then, the presence area candidate estimating unit 140A specifies the group of radio signal capturing terminals existing near the radio signal transmitting terminal 10.

To be more specific, the presence area candidate estimating unit 140A regards a group of the radio signal capturing terminals which obtains an RSSI having a value within a predetermined range equal to or less than a maximum value, to be the group of the radio signal capturing terminals existing near the radio signal transmitting terminal 10.

Here, it is assumed that a radio signal capturing terminal ID, which identifies a $j^{th}$ radio signal capturing terminal existed in an area m, is given by the following expression:

$$a_j^m$$

Further, it is assumed that the RSSI (reception level) associated with the radio signal capturing terminal ID is given by the following expression:

$$R(a_j^m)$$

Then, it is assumed that the maximum value of the RSSIs associated with all the radio signal capturing terminal ID is indicated as "Rmax", and the radio signal capturing terminal ID, which is included in the group of the radio signal capturing terminals existing near the radio signal transmitting terminal 10, is expressed in the following expression:

IN,

Here, the radio signal capturing terminal ID can be expressed by using the following equation (1).

$$IN=\{a_j^m | R(a_j^m) \geq Rmax - Rc\} \quad \text{equation (1)}$$

Note that "Rc" is stored in the area estimation attribute information storage unit 125 and indicates a threshold for specifying the group of the radio signal capturing terminals existing near the radio signal transmitting terminal 10.

Note that "Rc" indicates a threshold for specifying the group of the radio signal capturing terminals existing near the radio signal transmitting terminal 10, and is stored in the area estimation attribute information storage unit 125.

Figures 6, 7:
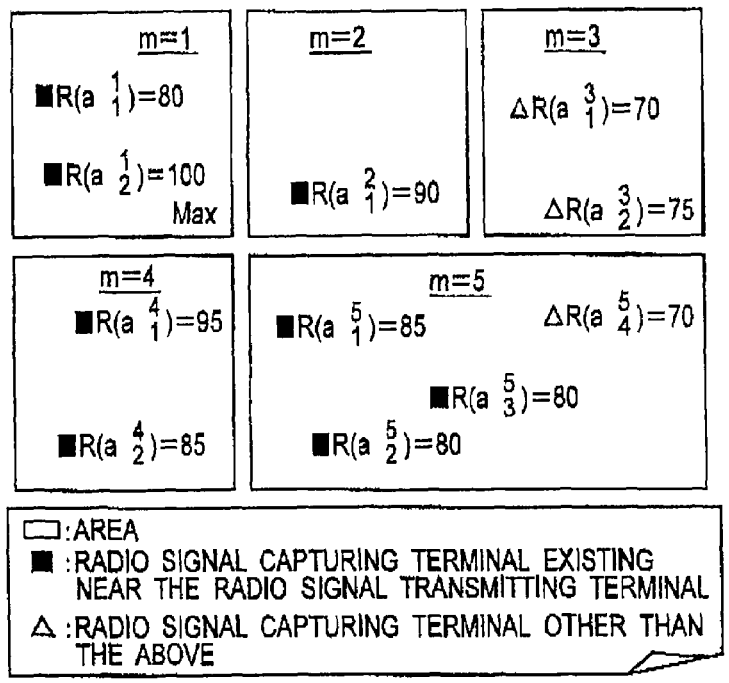
FIG. 6 is a view explaining an area estimation method according to the first embodiment of the present invention.
FIG. 7 is a view showing a relationship among a radio signal capturing terminal ID, an area m, and a radio signal capturing terminal number j in the area, in the first embodiment of the present invention.

FIG. 6 shows an example in which: the areas are estimated by using the information stored in the reception level storage unit 123 shown in FIG. 5; and which the estimation is started at a time, 2005-11-1-08:05:11; and N is 2.

In such case, the presence area candidate estimating unit 140A uses the reception levels obtained during a period between "2005-11-1-08:01:50:10 to 2005-11-1-08:01:50:11."

FIG. 7 shows a relationship among the radio signal capturing terminal ID, an area m, and a radio signal capturing terminal number j in an area.

Then, the presence area candidate estimating unit 140A obtains, from the radio signal capturing terminal attribute information storage unit 122, a group of presence area associated with the radio signal capturing terminal ID included in the group of the radio signal capturing terminals existing near the radio signal transmitting terminal 10.

When the plurality of the radio signal capturing terminals exist in each of the presence area, the presence area candidate estimating unit 140A specifies a representative radio signal capturing terminal.

When the presence area is indicated by "m'", it is highly possible that, in each of the presence area m', the radio signal capturing terminal identified by the radio signal capturing terminal ID associated with the maximum value of the RSSI will be the nearest to the radio signal transmitting terminal 10. Therefore, the presence area candidate estimating unit 140A regards the above-described radio signal capturing terminal to be a representative radio signal capturing terminal "$ha^{m'}$", in each of the presence area m'. Accordingly, the presence area candidate estimating unit 140A transmits "m'" and "$ha^{m'}$" to the presence area candidate narrowing unit 140B.

FIG. 8 shows an example of the representative radio signal capturing terminal $ha^{m'}$.

The presence area candidate narrowing unit 140B receives, from the presence area candidate estimating unit 140A, "m'", which is the presence area candidate of the radio signal transmitting terminal 10, and "$ha^{m'}$", which is the radio signal capturing terminal ID identifying the representative radio signal capturing terminal.

Then, the presence area candidate narrowing unit 140B calculates, for each "presence area" m', relative ratio magnitude (ratio) of the reception level R ("$ha^{m'}$") associated with a representative radio signal capturing terminal ID ham based on a relative ratio, in order to specify the confidence factor P (m') of the presence of the radio signal transmitting terminal 10.

Here, it should be noted that the confidence factor P (m') calculated by means of the aforementioned relative ratio does not represent the confidence factor of the area estimation result itself. Instead, the confidence factor P (m') represents a relative confidence factor in which the presence area of the radio signal transmitting terminal 10 is the presence area m', as compared with the result in which the presence area of the radio signal transmitting terminal 10 is the other area.

The confidence factor P (m') is calculated by using an equation (2). Note that K represents the number of areas included in the presence area candidates of the radio signal transmitting terminal 10.

$$p(m)' = \frac{R(ha^{m'})}{\sum_{k=1}^{k} R(ha^k)} \times 100 \quad \text{equation (2)}$$

Finally, the presence area candidate narrowing unit 140B sorts the confidence factor P (m') in descending order, and specifies a minimum presence area in which the radio signal capturing terminal has the confidence factor no less than the threshold Rc.

FIG. 9 shows an example in which Pc=50, and the estimation result is m'=1, 3.

Here, the presence area candidate narrowing unit 140B stores, in the radio signal transmitting terminal presence area storage unit 124, the radio signal transmitting terminal ID and the estimation time, in association with one another.

Thus, when a plurality of the radio signal capturing units 41a and 42b capture the radio signal transmitted from the radio signal transmitting terminal 10, the presence area estimating unit 140 estimates, as the presence area of the radio signal transmitting terminal 10, the presence area of the radio signal capturing terminal having the highest confidence factor, in consideration of the plurality of reception levels including the past records.

The presence area estimating unit 140 associates the radio signal transmitting terminal ID, the presence area, and the estimation time with one another, then stores the associated information in the radio signal transmitting terminal presence area storage unit 124. FIG. 10 shows an example of the estimation area information stored in the radio signal transmitting terminal presence area storage unit 124.

Further, the presence area estimating unit 140 obtains a mobile user name of the radio signal transmitting terminal 10 from the radio signal transmitting terminal attribute information storage unit 121 so as to display the mobile user name on the display unit 150. In this example, the display unit 150 shows, "Mr. Suzuki—Yamada's seat, Tanaka's seat" and "Mr. Yoshida—Yoshida's seat".

(Operation and Effects)

According to the area estimation system of this embodiment, the plurality of the radio signal capturing terminal 40a and 40b receive the radio signal (ICMP Echo Request packet) transmitted from the radio signal transmitting terminal 10, whose presence area is to be estimated, to the radio signal receiving terminal 30, and thus measure the reception levels (RSSI) of the radio signal.

Then, the area estimation apparatus 100 compares the reception levels of the radio signals measured by the radio signal capturing terminals 40a and 40b with one another. Further, the area estimation apparatus 100 determines the presence area of the at least one radio signal capturing terminals 40a and 40b judged as being near to the of the radio signal transmitting terminal 10, to be the presence area of the radio signal transmitting terminal 10.

As a result, in an environment where the radio signal reception levels frequently vary due to the movements of surrounding people or objects, it is possible to estimate, although the spatial width to be measured is increased, the presence area of the radio signal transmitting terminal 10 while maintaining a high confidence factor (reliability) without learning the radio signal reception level in advance, by determining that the at least one radio signal capturing terminals 40a and 40b existing near the radio signal transmitting terminal 10.

Further, according to the area estimation system of this embodiment, when the plurality of the radio signal capturing units 41a and 41b capture the radio signal from the radio signal transmitting-receiving unit 11, the presence area estimating unit 140 estimates the presence area of the radio signal capturing units 41a and 41b having the highest reception level to be the presence area of the radio signal transmitting terminal 10.

By comparing only the radio signal reception levels of the radio signal capturing units 41a and 41b with one another, and determining the presence area of the radio signal capturing unit 41a and 41b corresponding to the highest reception level to be the estimated area where the radio signal transmitting terminal 10 exists, the processing amount required for the area estimation can be reduced.

Moreover, according to the area estimation system of this embodiment, the reception level storage unit 123 is configured to store the reception level, the radio signal transmitting terminal ID, the radio signal capturing terminal ID, and the obtaining time in association with one another. Accordingly, it is possible to estimate the presence area of the radio signal transmitting terminal 10 in accordance with the time information.

Further, according to the area estimation system of this embodiment, the presence area estimating unit 140 is configured to estimate the presence of the radio signal transmitting terminal 10 in consideration of the past radio signal reception levels (past records) obtained by the radio signal capturing units 41a and 41b. Therefore, by specifying the radio signal capturing units 41a and 41b having the highest radio signal reception level, the presence area estimating unit 140 can estimate the presence area of the radio signal transmitting terminal 10 having a resistance to the temporal fluctuation of the radio signal caused by the movements of the surrounding people and the objects.

Moreover, according to the area estimation system of this embodiment, the presence area estimating unit 140 can estimate the presence area of the radio signal transmitting terminal 10 by using the latest radio signal reception level obtained by the radio signal capturing units 41a and 41b.

Further, according to the area estimation system of this embodiment, by comparing the radio signal reception levels obtained at the same time or the nearest time to a time when the radio signal receiving terminal 10 receives the radio signal, the presence area of the radio signal transmitting terminal 10 can be estimated with higher accuracy.

Moreover, according to the configuration of the area estimation system of this embodiment, the radio signal capturing terminals 40a and 40b and the area estimation apparatus are connected via the wired network and the radio signal capturing units 41a and 41b are configured to transmit, to the reception level receiving unit 110, the radio signal reception levels obtained via the wired network. This makes it possible to prevent the consumption of band in the wireless network.

Further, according to the area estimation system of this embodiment, it is possible to roughly specify the radio signal capturing terminals 40a and 40b, which may exist near the radio signal transmitting terminal 10, based on the radio signal reception level. Thereafter, the presence area candidate narrowing unit 140B introduces a parameter of the confidence factor, which is calculated based on the radio signal reception level. This makes it possible to appropriately narrow the presence areas of the radio signal transmitting terminal 10 which satisfy required confidence factor Pc, from the plurality of the presence area candidates of the radio signal transmitting terminal 10.

Moreover, according to the area estimation system of this embodiment, the presence area candidate estimating unit 140A can appropriately specify the presence areas of the radio signal capturing terminals 40a and 40b, which exists near the radio signal transmitting terminal 10, based on the attenuation properties of the radio signal reception levels.

Further, the area estimation system of this embodiment can solve the problem that the confidence factor is high in the area in which the number of the existing radio signal capturing terminals 40a and 40b is large, in the processing of the presence area candidate narrowing unit 140B, when the number of radio signal capturing terminals 40a and 40b existing in each area is different.

According to the area estimation system of this embodiment, the presence area candidate narrowing unit 140B determines the confidence factor based on the relative magnitude (ratio) of the radio signal reception levels for the other radio signal capturing terminals 40a and 40b. Accordingly, the confidence factor can be appropriately specified in consideration of the attenuation properties of the reception levels.

Moreover, according to the area estimation system of this embodiment, the confidence factor is changed in the range of 0% to 100% when the aforementioned relative ratio of the reception levels is used. Accordingly, the threshold of the confidence factor required by the user can be easily designated.

Furthermore, according to the area estimation system of this embodiment, it is possible to calculate a confidence factor indicating a possibility that the radio signal transmitting terminal 10 exists near the representative radio signal capturing terminal in each area, based on the relative magnitude (ratio) of the radio signal reception levels for the radio signal capturing terminals 40a and 40b. Then, by specifying the presence areas of the group of the radio signal capturing terminals 40a and 40b which satisfy the threshold calculated in connection with the confidence factor, the estimation can be performed while satisfying the calculated confidence factor.

Modified Example

Sequentially, the following will explain modified examples of the area estimation apparatus according to this embodiment.

The area estimation system according to the first embodiment includes the indoor base station 20. However, the area estimation apparatus 100 can be operated without the indoor base station 20, as far as the radio signal transmitting terminal 10 and the radio signal receiving terminal 30 are connected to each other in an ad hoc mode.

Figure 11:
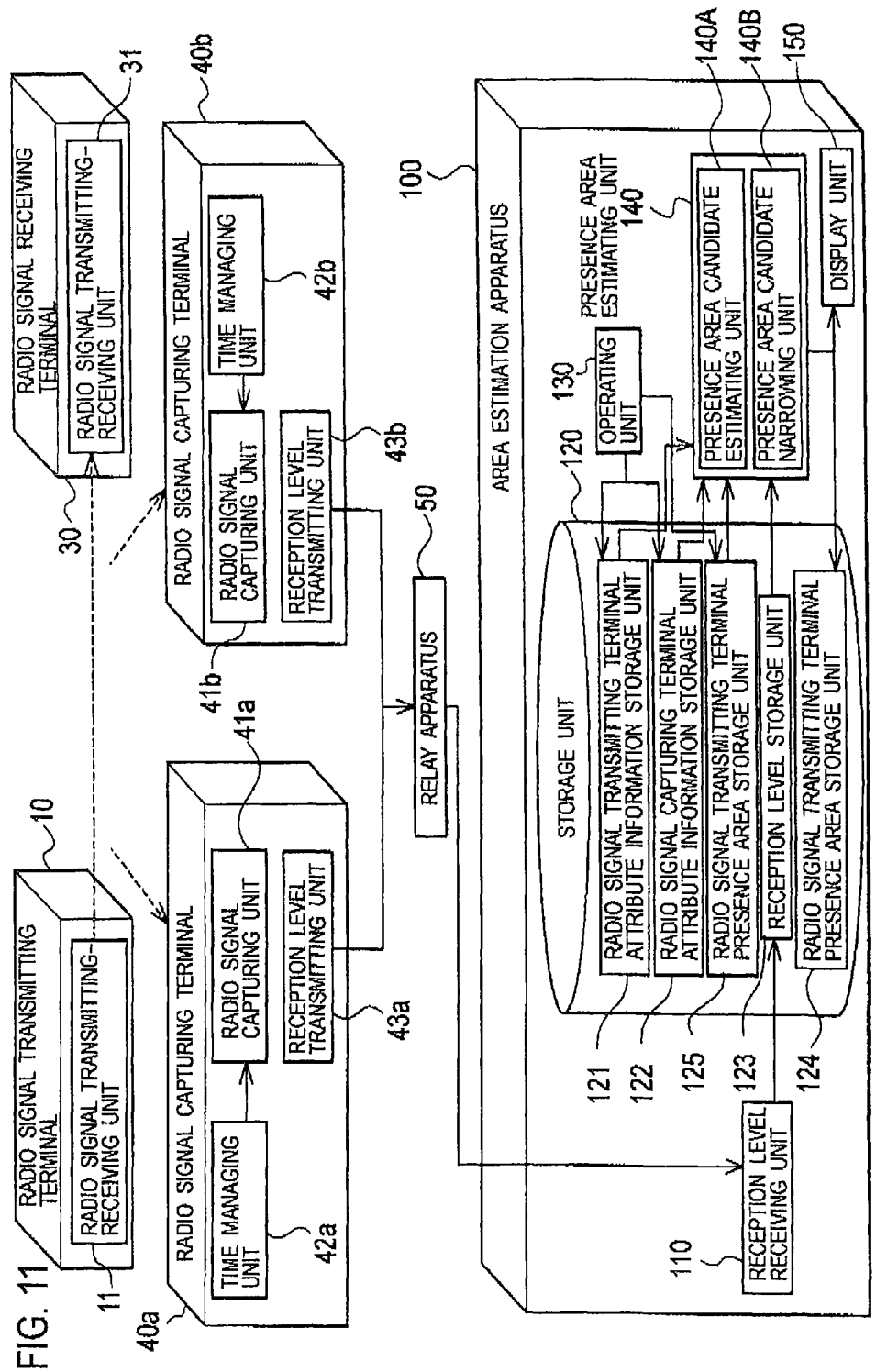
FIG. 11 is an entire configuration view of an area estimation system according to a modified example of the first embodiment of the present invention.

FIG. 11 shows a configuration of this modified example, in which the area estimation system can be performed without an indoor base station 20.

Moreover, the area estimation system of the first embodiment includes the relay apparatus 50. Nevertheless, the area estimation apparatus 100 can be operated without the relay apparatus 50, by performing the communication between radio signal capturing terminals 40a and 40b and the area estimation apparatus 100 via a wireless network.

According to this configuration, the area estimation system according to the present embodiment can be utilized even in an environment which does not include the wired network, particularly.

In addition, in the area estimation system of the first embodiment, the ICMP Echo Request packet is transmitted from the radio signal transmitting terminal 10, whose presence area is unknown, to the radio signal receiving terminal 30. However, the present invention is not limited to this configuration.

In other words, in this modified example, the radio signal receiving terminal 30 or the area estimation apparatus 100 obtains the IP address of the radio signal transmitting terminal 10 from the radio signal transmitting terminal attribute information storage unit 121, and transmits an ICMP Echo Request packet to the radio signal transmitting terminal 10. Then, the radio signal capturing terminals 40a and 40b capture an ICMP Echo Reply packet, which is a reply packet to the ICMP Echo Request packet. In this manner, the reception levels are obtained, and thus the presence area of the radio signal transmitting terminal 10 can be estimated.

In order to achieve this configuration, an administrator previously need to store the IP addresses corresponding to the radio signal transmitting terminal IDs in the radio signal transmitting terminal attribute information storage unit 121. FIG. 12 shows an example of the information stored in the radio signal transmitting terminal attribute information storage unit 121.

This configuration makes it possible to estimate the presence area of the radio signal transmitting terminal 10 without adding particular functions, even when the radio signal transmitting terminal 10 is a mobile phone or the like and thereby executing an program for transmitting a radio signal or the like is difficult.

When the radio signal transmitting terminal 10 cannot transmit an ICMP Echo Request packet with the reason that it is out of a transmittable place or the like, the transmission of the ICMP Echo Request packet is suspended at a time when the transmission failures of the ICMP Echo Request packet reach to a predetermined number of times.

The radio signal transmitting terminal 10 which thus suspends the transmission of the ICMP Echo Request packet may be configured to restart the transmission of the ICMP Echo Request packet after a predetermined period of time. Alternatively, the radio signal transmitting terminal 10 may be configured to restart the transmission of the ICMP Echo Request packet in response to an explicit request from the administrator.

Moreover, when the area estimation apparatus 100 transmits the ICMP Echo Request packet to all of the radio signal transmitting terminals 10, a broadcast packet can be used so as to reduce the traffic in the wireless network.

Further, in the area estimation system of the first embodiment, the configuration is provided so as to estimate the presence area of the radio signal transmitting terminal 100 by using the ICMP Echo Request packet transmitted from the radio signal transmitting terminal 10, whose presence area is unknown, to the radio signal receiving terminal 30. However, any type of radio signals can be used to estimate the presence area of the radio signal transmitting terminal 10, as long as the radio signals are transmitted from the radio signal transmitting terminal 10, whose presence area is unknown, to the radio signal receiving terminal 30.

For example, it is possible to estimate the presence area of the radio signal transmitting terminal 10 by using: a management packet such as ProbeRequest or the like, which is usually periodically transmitted from the radio signal transmitting terminal 10; a control packet such as PS-Poll or the like; a data packet which is transmitted from the radio signal transmitting terminal 10 in data communications.

This configuration makes it possible to reduce a communication traffic required for the estimation of the presence area of the radio signal transmitting terminal 10.

Moreover, in the area estimation system of the first embodiment, the reception level transmitting units 43a and 43b of the radio signal capturing terminals 40a and 40b transmit a column of the reception levels obtained for a certain period of time. Alternatively, a configuration may be made such that the reception level transmitting units 43a and 43b calculate the average value, the median value and the maximum value of the reception levels in the column obtained for the certain period of time, and then transmit the result of the calculation in association with: the MAC address for uniquely identifying the radio signal transmitting terminal 10; the MAC address for uniquely identifying the own radio signal capturing terminal 40a or 40b; and the obtaining time which is obtained from the time managing unit 42a or 42b.

This configuration makes it possible to reduce the communication traffic required for the estimation of the presence area of the reception level.

Further, in the area estimation system of the first embodiment, the reception level transmitting units 43a and 43b of the radio signal capturing terminals 40a and 40b transmit, to the area estimation apparatus 100, asynchronously, the reception levels and the related information which are obtained by the radio signal capturing units 41a and 41b. However, the reception level receiving unit 110 may be configured to control a timing of transmitting the reception levels.

To be more specific, as shown in FIG. 13, the administrator previously registers the IP address of each of the radio signal capturing terminal ID in the radio signal capturing terminal attribute information storage unit 122.

Then, the reception level receiving unit 110 transmits a transmission request to the reception level transmitting units 43a and 43b of the radio signal capturing terminal 40a and 40b registered in the radio signal capturing terminal attribute information storage unit 122. Then, the reception level transmitting units 43a and 43b, which have received the transmission request, transmit the reception level and the related information to the reception level receiving unit 110.

As a transmission control method, it may be configured such that the transmission of the transmission request to all the radio signal capturing terminals 40a and 40b is limited to only one of the reception level transmitting unit 43a and 43b at one time. Alternatively, it may be configured such that the transmission of the transmission request to a group of the radio signal capturing terminals 40a and 40b connected to a specific relay apparatus 50 or an indoor base station 20 is limited to one of the reception level transmitting unit 43a and 43b, at one time.

In addition, there is a possibility that some of the radio signal capturing terminals 10 registered in the radio signal capturing terminal attribute information storage unit 122 are out of operation. For this reason, when the reception level receiving unit 110 does not receive any reply, from a specific radio signal capturing terminal, to the transmission requests for a predetermined number of times, the reception level receiving unit 110 may be configured not to transmit the transmission request to the specific radio signal capturing terminal.

In addition, the reception level transmitting unit 43a and 43b may be configured to restart the transmission of the transmission request to the radio signal capturing terminal which has been once excluded from the target for the transmission request, when a predetermined period of time has passed, or in response to an explicit request from the administrator.

This configuration makes it possible, particularly when the communication is made between radio signal capturing terminals 40a and 40b and the area estimation apparatus 100 via a wireless network, to avoid a collision and the retransmission of packets transmitted from the reception level transmitting unit 43a and 43b to the reception level receiving units 110. Therefore, an increase in the network traffic, which would occur due to the retransmission of the packets, can be prevented.

Furthermore, in the area estimation system of the first embodiment, the radio signal capturing terminals 40a and 40b include only one of the radio signal capturing units 41a and 41b, respectively. However, they may include a plurality of radio signal capturing units 41a and 41b, respectively. When each of the radio signal capturing units 41a and 41b is formed of an USB-type wireless LAN adaptor, a plurality of radio signal capturing units 41a and 41b can be physically mounted in each of the radio signal capturing terminals 40a and 40b.

In addition, by using a USB hub or a USB extension cable, each of the radio signal capturing terminals 40a and 40b can be corresponded to a plurality of areas which are distantly separated from each other.

This configuration makes it possible to reduce the number of the radio signal capturing terminals 40a and 40b, thereby reducing the cost of hardware.

Moreover, when the radio signal capturing terminals 40a and 40b include a plurality of the radio signal capturing units 41a and 41b, respectively, the reception level transmitting units 43a and 43b are required to transmit the radio signal reception levels which are obtained by the respective radio signal capturing units 41a and 41b and which is transmitted from the radio signal transmitting terminal 10.

Furthermore, it may be configured such that a comparison of the radio signal reception level is performed for the radio signal reception levels obtained by all of the radio signal capturing units 41a and 41b connected to the same radio signal capturing terminals 40a and 40b, and that the obtained radio signal reception level, in association with the radio signal transmitting terminal ID and the radio signal capturing terminal ID, is transmitted to each of the radio signal transmitting terminals 10.

This configuration makes it possible to reduce the data amount transmitted to the area estimation apparatus 100, and to reduce the traffic amount.

Second Embodiment

In the first embodiment, the presence area estimating unit 140 executes the estimation of the presence area of the radio signal transmitting terminal 10 with a static time interval, such as every one second. Moreover, the number of the radio signal reception levels (number of the past records) used for the estimation of the presence area of the radio signal transmitting terminal 10 is also constant.

In contrast to this, the area estimation system according to this second embodiment is configured such that an area estimation frequency determining unit 160 is added so as to determine an area estimation frequency based on any of the presence area of a radio signal transmitting terminal 10 and the attribute information of the radio signal transmitting terminal 10.

Moreover, the area estimation system according to this embodiment is configured such that a staying-moving judgment unit 180 is added. Therefore, the staying-moving judgment unit 180 judges whether a user carrying the radio signal transmitting terminal 10 is staying in an area or "moving between areas", and the area estimation frequency determining unit 160 determines the area estimation frequency based on the result of the judgment.

Further, the area estimation system according to this embodiment is configured such that a reception level-record-use number determination unit 190 is added so as to determine the number of the radio signal reception levels to be used (the number of the past records) based on the result of the judgment.

(Area Estimation System)

Figure 14:
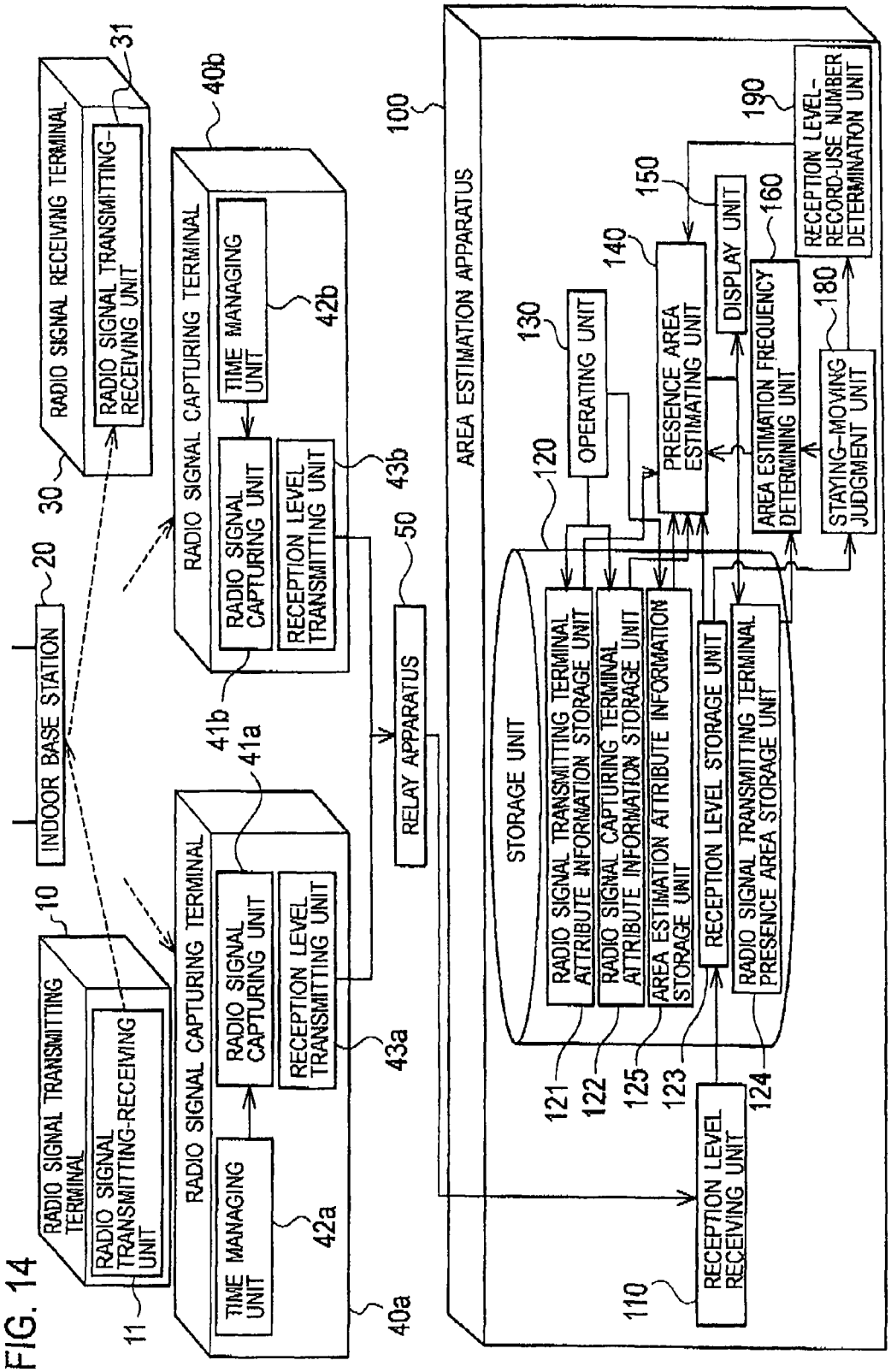
FIG. 14 is an entire configuration view of an area estimation system according to a second embodiment of the present invention.

As shown in FIG. 14, the area estimation system according to this embodiment includes a radio signal transmitting terminal 10, an indoor base station 20, a radio signal receiving terminal 30, radio signal capturing terminals 40a and 40b, a relay apparatus 50 and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

Moreover, the area estimation apparatus 100 includes a reception level receiving unit 110, a storage unit 120, an operating unit 130, a presence area estimating unit 140, a display unit 150, an area estimation frequency determining unit 160, a staying-moving judgment unit 180 and a reception level-record-use number determination unit 190.

The reception level receiving unit 110, the storage unit 120, the operating unit 130 and the display unit 150 are also the same as those in the first embodiment, and thus the explanation thereof is omitted here as well.

The staying-moving judgment unit 180 is configured to judge whether the radio signal transmitting terminal 10 is "moving between areas" or staying in an area.

To be more specific, the staying-moving judgment unit 180 refers to a radio signal transmitting terminal presence area storage unit 124 and a radio signal capturing terminal attribute information storage unit 122, after the presence area estimating unit 140 executes the estimation of the presence area of the radio signal transmitting terminal 10. Then, the staying-moving judgment unit 180 judges that the radio signal transmitting terminal 10 is "staying in the area", when the presence areas of the radio signal transmitting terminal 10 estimated in the last Ts seconds before the current time are identical.

Here, Ts is set such that at least one estimation results are included in the radio signal transmitting terminal presence area storage unit 124.

Meanwhile, when the presence areas of the radio signal transmitting terminal 10 estimated in the last Ts seconds before the current time are not identical, the staying-moving judgment unit 180 judges that the radio signal transmitting terminal 10 is "moving between areas".

Alternatively, the staying-moving judgment unit 180 judges whether the radio signal transmitting terminal 10 is "moving between areas" or "staying in an area", on the basis of the time variation of either the radio signal reception levels or the confidence factors of a radio signal transmitting terminal 10 obtained by radio signal capturing terminals 40*a* and 40*b* existing near the radio signal transmitting terminal 10.

When a radio signal reception level or a confidence factor from the radio signal transmitting terminal 10 exceeds a threshold value THsd in the last Tsd seconds before the current time in at least a group of radio signal capturing terminals 40*a* and 40*b* existing near the radio signal transmitting terminal 10, the staying-moving judgment unit 180 judges that the radio signal transmitting terminal 10 is "staying in the area".

While, when the radio signal transmitting terminal 10 is not judged as "staying in the area" and reception levels or confidence factors from the radio signal transmitting terminal 10 fall below the threshold value THmd in at least one or two groups of radio signal capturing terminals 40*a* and 40*b* existing near the radio signal transmitting terminal 10, the staying-moving judgment unit 180 judges that the radio signal transmitting terminal is "moving between areas"

The area estimation frequency determining unit 160 is configured to determine the area estimation frequency based on the result of the judgment made by the staying-moving judgment unit 180, as follows:

1) "moving between areas": a basic area estimation interval; and
2) "staying in an area": min (a constant number times the basic area estimation interval, the maximum allowable area estimation interval), or min (n times the basic area frequency interval, the maximum allowable area estimation interval).

Here, the basic area estimation interval is assumed to be set in advance. Moreover, n denotes the number of times that the area estimation frequency determining unit 160 judges that a radio signal transmitting terminal is "staying in an area" after judgments are made whether the terminal is "moving between areas" or "staying in an area"

Note that an ICMP Echo Request packet and an ICMP Echo Reply packet are transmitted Np times at intervals of Tdp seconds at every area estimation frequency determined as described above.

Tdp is set in advance in consideration of the realtimeness and the load on the system. Np is set in advance in consideration of the number of data records of reception levels required for the area estimation to be resistible to noise.

The optimal Tdp and Np can be obtained through experiments, and it is appropriate that Tdp is set at 0.5 to 1 second, and that Np is set at 1 to 10.

In addition, Tdp and Np may be configured to be set differently depending on whether the radio signal transmitting terminal 10 is "staying in an area" or "moving between areas."

Moreover, as to the a time range N relating to the number of reception levels (the number of the past records) to be used in estimating the presence area of the radio signal transmitting terminal 10, it is effective that the smaller number of seconds is employed among: the number of seconds which allows to use all the reception levels of ICMP Echo Request packets transmitted during one area estimation period; and (the current time−the area changing time).

As for the former number of seconds, in other words, it is desirable that an inequality "$N > Tdp \times Np + \alpha$" be satisfied. Here, a denotes a delay time of an ICMP Echo Request packet.

As for the latter number of seconds, the area changing time denotes the latest time when one of the nearest radio signal capturing terminals 40*a* and 40*b* has been changed to the newest one in the radio signal transmitting terminal presence area storage unit 124.

The reception level-record-use number determination unit 190 is configured to determine the number of the reception levels (the number of the past records) to be used based on whether a radio signal transmitting terminal 10 is "staying in an area" or "moving between areas."

Moreover, the presence area estimating unit 140 is configured to estimate the presence area of the radio signal transmitting terminal 10 according to the area estimation frequency determined by the area estimation frequency determining unit 160.

The other functions of the presence area estimating unit 140 are the same as those in the first embodiment, and thus the explanation thereof is omitted here.

(Area Estimation Method)

Sequentially, an area estimation method of the second embodiment will be described with reference to FIG. 15.

Step S201 is the same as step S101 in FIG. 2, and thus the explanation thereof is omitted here.

In step S202, the radio signal transmitting terminal 10 transmits a radio signal to the radio signal receiving terminal 30.

Specifically, the radio signal transmitting terminal 10 transmits an ICMP Echo Request packet (radio signal) to the radio signal receiving terminal 30.

Here, the area estimation apparatus 100 or the radio signal capturing terminals 40*a* and 40*b* may additionally serve as the radio signal receiving terminal 30.

Each of intervals at which an ICMP Echo Request packet is transmitted is equivalent to the area estimation frequency determined by the area estimation frequency determining unit 160.

Steps S203 to S205 are the same as steps S103 to S105 in FIG. 2, and thus the explanation thereof is omitted here.

In step S206, the area estimation apparatus 100 judges whether the radio signal transmitting terminal 10 is "moving between areas" or is "staying in an area."

Specifically, after the area estimation apparatus 100 estimates the presence area of the radio signal transmitting terminal 10, the staying-moving judgment unit 180 refers to a radio signal transmitting terminal presence area storage unit 124 and a radio signal capturing terminal attribute information storage unit 122. If the presence area of the radio signal transmitting terminal 10 estimated in the last Ts seconds before the current time are identical, the staying-moving judgment unit 180 judges that the radio signal transmitting terminal 10 is "staying in the area".

Here, Ts is set such that at least one estimation result is contained in the radio signal transmitting terminal presence area storage unit 124.

Meanwhile, if the presence areas of the radio signal transmitting terminal 10 estimated in the last Ts seconds before the current time are not identical, the staying-moving judgment unit 180 judges that the radio signal transmitting terminal 10 is "moving between the areas."

Thereafter, both of the frequency of transmitting an ICMP Echo Request packet/an ICMP Echo Replay packet, and the area estimation frequency are determined for both of the cases where the radio signal transmitting terminal is "staying in the area" and where the terminal is "moving between the areas."

Next, in step S207, the area estimation apparatus 100 determines the area estimation frequency, based on whether the radio signal transmitting terminal 10 is "moving between the areas" or "staying in the area."

Specifically, if the staying-moving judgment unit 180 judges that the radio signal transmitting terminal 10 is "moving between the areas" in the above-described manner, the area estimation frequency determining unit 160 sets the area estimation frequency and the transmission frequency of ICMP Echo Request packet for a case where the radio signal transmitting terminal 10 is "moving between the areas."

On the other hand, if the staying-moving judgment unit 180 judges that the radio signal transmitting terminal 10 is "staying in the area" in the above-described manner, the area estimation frequency determining unit 160 sets the area estimation frequency and the transmission frequency of ICMP Echo Request packet for a case where the radio signal transmitting terminal 10 is "staying in the area."

Here, in general, it is desirable that the area estimation frequency determining unit 160 set the area estimation frequency and the transmission frequency of ICMP Echo Request packet such that the following two inequalities 1) and 2) can be satisfied: 1) Area estimation frequency if the radio signal transmitting terminal 10 is "moving between areas">Area estimation frequency if the radio signal transmitting terminal 10 is "staying in an area"; and 2) transmission frequency of ICMP Echo Request packet if the radio signal transmitting terminal 10 is "moving between areas">transmission frequency of ICMP Echo Request packet if the radio signal transmitting terminal 10 is "staying in an area"

At the same time, in step S208, the area estimation apparatus 100 determines the number of reception levels (the number of the past records) to be used based on whether the radio signal transmitting terminal 10 is "moving between the areas" or "staying in the area".

To be more specific, if the above-mentioned staying-moving judgment unit 180 judges that the radio signal transmitting terminal 10 is "moving between the areas", the reception level-record-use number determination unit 190 sets the number of reception levels for the case that the radio signal transmitting terminal 10 is "moving between areas."

On the other hand, if the abovementioned staying-moving judgment unit 180 judges that the radio signal transmitting terminal 10 is "staying in an area", the reception level-record-use number determination unit 190 sets the number of reception levels for the case that the radio signal transmitting terminal 10 is "staying in the area."

Here, in general, it is desirable that the reception level-record-use number determination unit 190 set the number of reception levels such that the following inequality can be satisfied: The number of reception levels if the radio signal transmitting terminal 10 is "moving between areas"<the number of reception levels if the radio signal transmitting terminal 10 is "staying in an area"

(Operations and Effects)

According to the area estimation system of this embodiment, it is possible to appropriately determine the area estimation frequency based on the attribute information of the radio signal transmitting terminal 10 and the presence area thereof. This makes it possible to perform the area estimation for every radio signal transmitting terminal 10 with the frequency as required, thus allowing a reduction in the network traffic, in the load on the system and in the power consumption.

Further, the estimation system of this embodiment makes it possible to perform the estimation whether the radio signal transmitting terminal is "staying in the area" or "moving between the areas", besides the estimation of the presence area of the radio signal transmitting terminal 10.

Furthermore, according to the estimation system of this embodiment, it is possible to appropriately determine the number of the past records of the radio signal reception levels to be used, based on whether the radio signal transmitting terminal 10 is "staying in an area" or "moving between areas."

Specifically, when the radio signal transmitting terminal 10 is staying in an area, the number of the past records of the radio signal reception levels to be used is set large. This makes it possible to accommodate an estimation error attributable to the temporal fluctuation of the radio signal reception level and to improve the confidence factor.

On the other hand, when the radio signal transmitting terminal 10 is moving between areas, the number of the past records of the radio signal reception levels to be used is set small. This makes it possible to appropriately estimate the presence area of the radio signal transmitting terminal 10 that is changing from one to another every moment.

Moreover, the estimation system of this embodiment makes it possible to dynamically change the area estimation frequency based on whether the radio signal transmitting terminal 10 is "moving between areas" or "staying in an area". As a result, when the radio signal transmitting terminal 10 is "staying in an area", the estimation frequency can be reduced mainly and thereby the network traffic and the load on the system can be reduced.

Specifically, when the radio signal transmitting terminal 10 is staying in an area, the area estimation frequency is set large, thus allowing in a reduction in the network traffic, in the load on the system and in the power consumption.

On the other hand, when the radio signal transmitting terminal 10 is moving between areas, the area estimation frequency is set small, and thereby the presence area can be estimated in real time.

Third Embodiment

In the second embodiment, the area estimation frequency determining unit 160 operates without considering attributes of a user and an area.

In contrast to this, the area estimation system according to a third embodiment is configured such that an area estimation frequency storage unit 126 is added to thereby estimate the presence area of the radio signal transmitting terminal 10 at appropriate frequency, based on the attribute information of the radio signal transmitting terminal 10 and radio signal capturing terminals 40a and 40b, or based on the presence area of the radio signal transmitting terminal 10.

(Area Estimation System)

Figure 15:
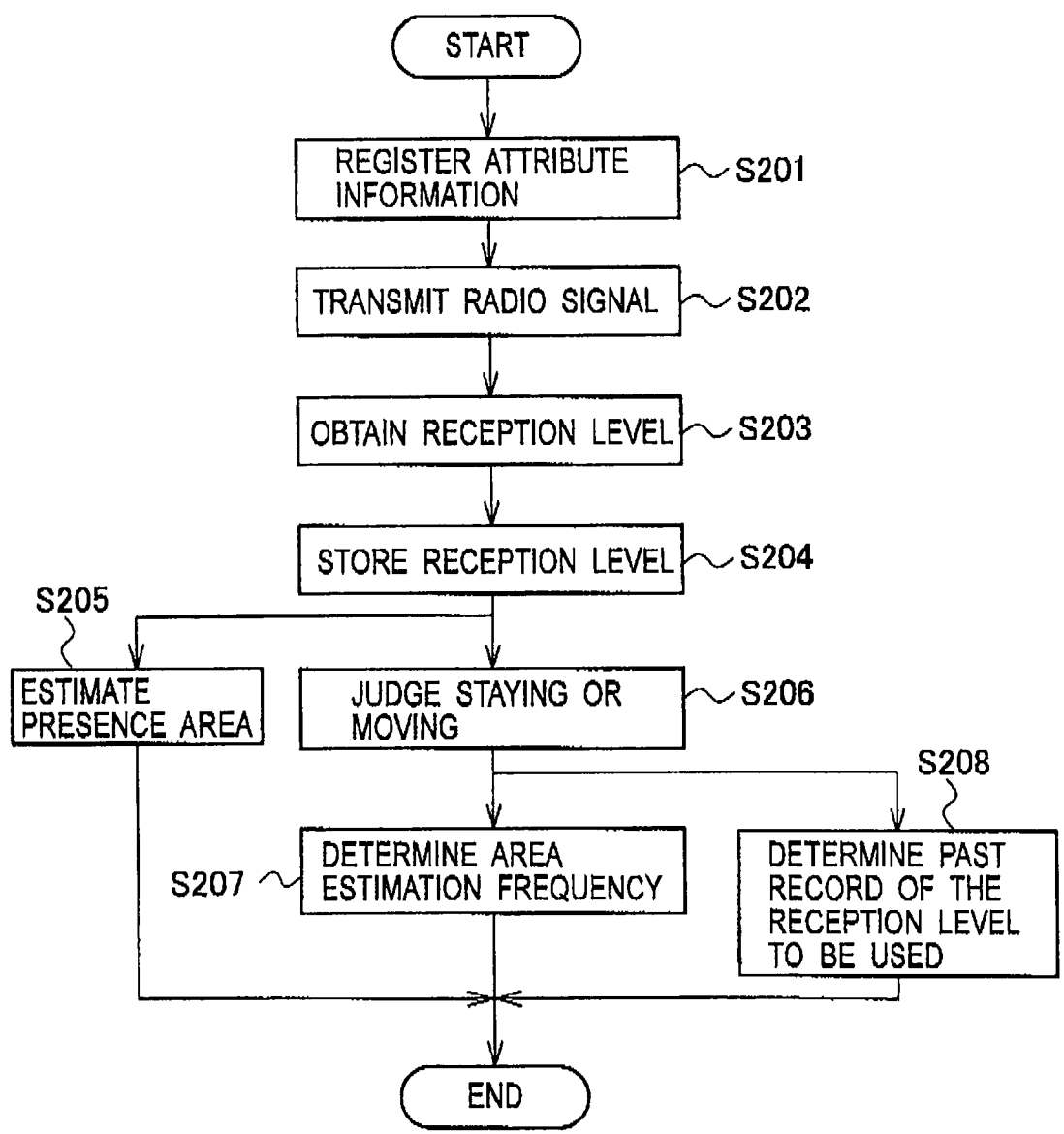
FIG. 15 is a flowchart showing an area estimation method according to the second and a third embodiments of the present invention.
Figure 16:
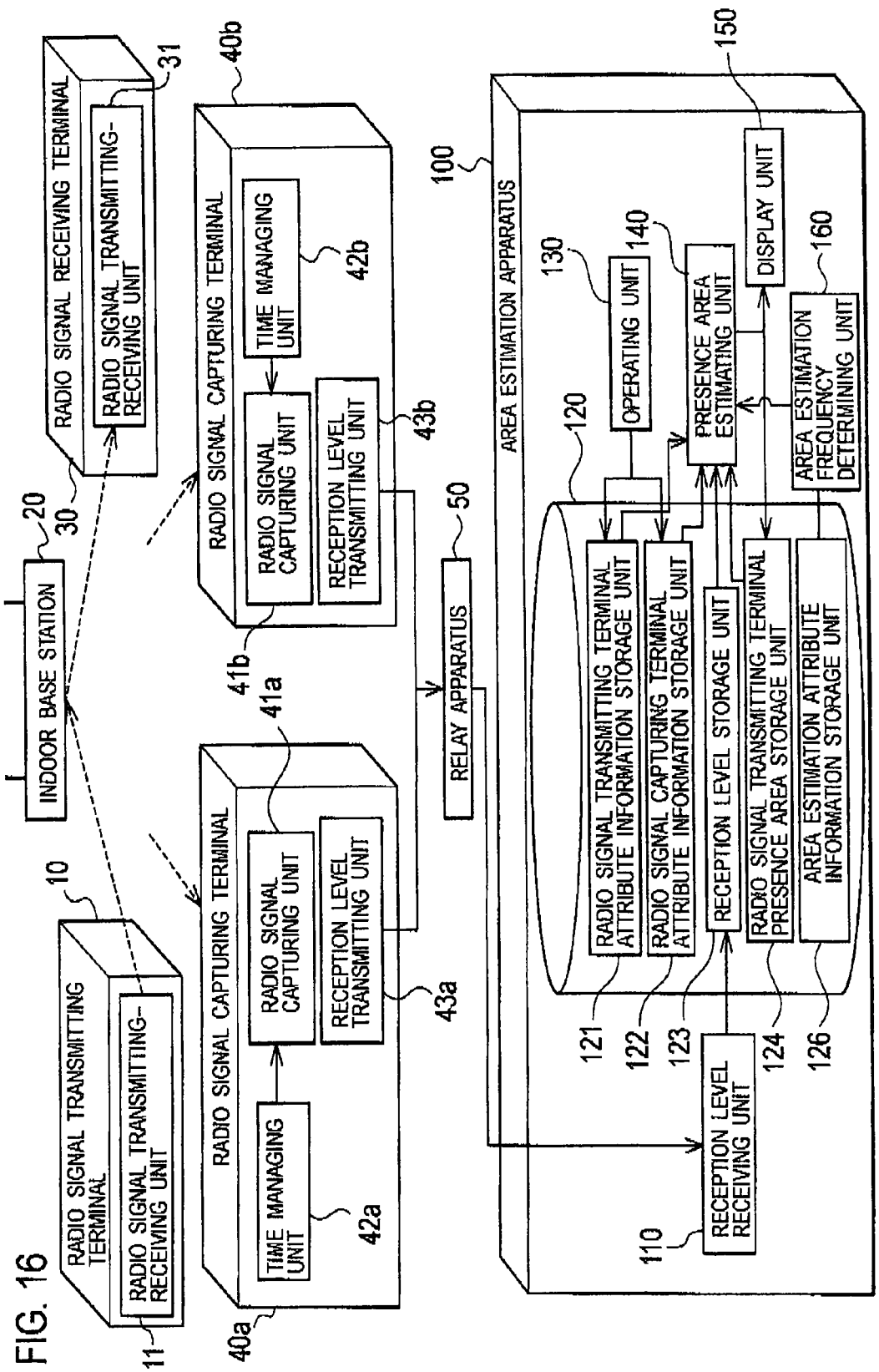
FIG. 16 is an entire configuration view of an area estimation system according to the third embodiment of the present invention.

As shown in FIG. 15, an area estimation system of this embodiment includes a radio signal transmitting terminal 10, an indoor base station 20, a radio signal receiving terminal 30, radio signal capturing terminals 40a and 40b, a relay apparatus 50, and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

Moreover, the area estimation apparatus 100 includes a reception level receiving unit 110, a storage unit 120, an operating unit 130, the presence area estimating unit 140, a display unit 150 and an area estimation frequency determining unit 160.

The reception level receiving unit 110, the operating unit 130 and the display unit 150 are the same as those in the first embodiment, and thus the explanation thereof is omitted here.

The area estimation frequency determining unit 160 is configured to by refer a radio signal transmitting terminal attribute information storage unit 121, and to obtain the attribute information of the radio signal transmitting terminal 10.

Moreover, the area estimation frequency determining unit 160 is configured to refer to a radio signal transmitting terminal presence area storage unit 124, and to obtain the presence area of the radio signal transmitting terminal 10.

Also, the area estimation frequency determining unit 160 is configured to refer to the area estimation frequency storage unit 126, and to obtain the estimation frequency corresponding to the attribute information of the radio signal transmitting terminal 10 and/or the presence area of the radio signal transmitting terminal 10, and thereby to determine the area estimation frequency.

The storage unit 120 includes the radio signal transmitting terminal attribute information storage unit 121, a radio signal capturing terminal attribute information storage unit 122, a reception level storage unit 123, the radio signal transmitting terminal presence area storage unit 124, and the area estimation frequency storage unit 126.

The radio signal transmitting terminal attribute information storage unit 121, the radio signal capturing terminal attribute information storage unit 122, the reception level storage unit 123 and the radio signal transmitting terminal presence area storage unit 124 are the same as those in the first embodiment, and thus the explanation thereof is omitted here.

As shown in FIG. 17, the area estimation frequency storage unit 126 is configured to store the estimation frequency corresponding to the attribute information of the radio signal transmitting terminal 10 and/or the presence area of the radio signal transmitting terminal 10.

Here, specific personal names or area names such as "Mr. Yamada" and/or "Meeting room No. 101" may be respectively entered for indicating "mobile user name" and "presence area name." Alternatively, general personal names and/ or area names each indicating a particular category such as "Company staff" or "Meeting room" may be respectively entered for indicating "mobile user name" and "presence area name."

In this example, as shown in FIGS. 18 and 19, these general names need to be stored in the radio signal transmitting terminal attribute information storage unit 121 and the radio signal capturing terminal attribute information storage unit 122.

(Area Estimation Method)

Sequentially, an area estimation method of this embodiment will be described by using FIG. 15.

Steps S201 to S205 are the same as those in the second embodiment, and thus the explanation thereof is omitted here.

In step S207, the area estimation apparatus 100 judges whether the radio signal transmitting terminal 10 is "moving between areas" or "staying in an area", and then determines the area estimation frequency.

To be more specific, the area estimation frequency determining unit 160 obtains a "mobile user name" corresponding to the radio signal transmitting terminal 10, by referring to the radio signal transmitting terminal attribute information storage unit 121.

Alternatively, the area estimation frequency determining unit 160 may obtain the "presence area" of the radio signal transmitting terminal 10, by referring to the radio signal transmitting terminal presence area storage unit 124.

Then, the area estimation frequency determining unit 160 refers to the area estimation frequency storage unit 126 and obtains the "estimation frequency" corresponding to the "mobile user name" and the "presence area", which are obtained in the above-described manner. Thus the area estimation frequency determining unit 160 determines the area estimation frequency.

(Operations and Effects)

Accordingly, the area estimation system of this embodiment makes it possible to dynamically change the area estimation frequency. Based on the attribute information of the radio signal transmitting terminal 10 or the presence area the radio signal transmitting terminal 10. As a result, the area estimation can be performed at the minimum required frequency in accordance with the attribute information of the radio signal transmitting terminal 10 or the presence area of the radio signal transmitting terminal 10, the network traffic and the load on the system can be reduced.

Fourth Embodiment

In the above-described first embodiment, the presence area estimating unit 140 operates without consideration of the individual differences in the hardware which constitute the radio signal capturing units 41a and 41b.

In contrast to this, the area estimation system according to the fourth embodiment is configured such that a relative reception level determining unit 170 is added so as to neutralize the individual differences in the hardware without performing a complicated calibration or the like, and thus to estimate the presence area of the radio signal transmitting terminal 10.

(Area Estimation System)

Figure 20:
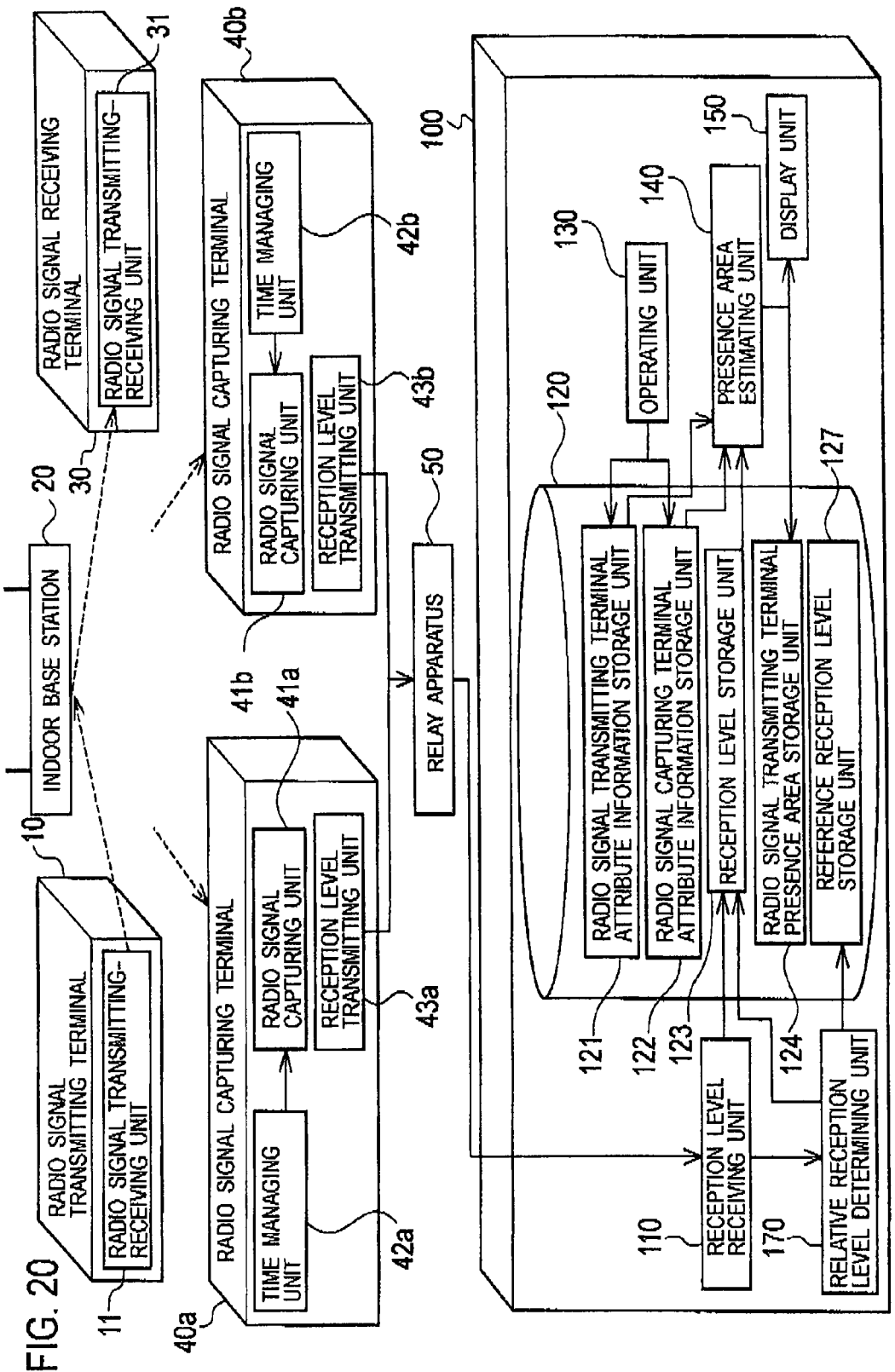
FIG. 20 is an entire configuration view of an area estimation system according to a fourth embodiment of the present invention.

As shown in FIG. 20, an area estimation system of this fourth embodiment includes a radio signal transmitting terminal 10, an indoor base station 20, a radio signal receiving terminal 30, radio signal capturing terminals 40a and 40b, a relay apparatus 50, and an area estimation apparatus 100.

The radio signal transmitting terminal 10, the indoor base station 20, the radio signal receiving terminal 30, the radio signal capturing terminals 40a and 40b and the relay apparatus 50 are the same as those in the first embodiment, and thus the explanation thereof is omitted here.

Moreover, the area estimation apparatus 100 includes a reception level receiving unit 110, a storage unit 120, an operating unit 130, a presence area estimating unit 140, a display unit 150, and a relative reception level determining unit 170.

Moreover, the storage unit 120 includes a radio signal transmitting terminal attribute information storage unit 121, a radio signal capturing terminal attribute information storage unit 122, a reception level storage unit 123, a radio signal transmitting terminal presence area storage unit 124 and a reference reception level storage unit 125.

The reception level receiving unit 110, the radio signal transmitting terminal attribute information storage unit 121, the radio signal capturing terminal attribute information storage unit 122, the reception level storage unit 123 and the radio signal transmitting terminal presence area storage unit 124, the operating unit 130 and the display unit 150 are also the same as those in the first embodiment, and thus the explanation thereof is omitted here.

The relative reception level determining unit 170 is configured to refer to the reception level storage unit 123, and to a reference reception level for each combination of [radio signal transmitting terminal ID, radio signal capturing terminal ID], or for each of the radio signal capturing terminals 40a and 40b.

Alternatively, the relative reception level determining unit 170 is configured to refer to the reception level storage unit 123, and to determine the reference reception level for a combination of [a radio signal transmitting terminal 10, each of the radio signal capturing terminals 40a and 40b], or for each of the radio signal capturing terminals 40a and 40b. Here, the radio signal capturing terminals 40a and 40b are existed in the seat area of a user carrying the radio signal transmitting terminal 10.

The reference reception level is determined, by using the stored past records of radio signal reception levels for of each combination of [radio signal transmitting terminal ID, radio signal capturing terminal ID], a combination of [a radio signal transmitting terminal 10, each of the radio signal capturing terminals 40a and 40b], or each of the radio signal capturing terminals 40a and 40b. As the reference reception level, it is appropriate to adopt any of 1) the maximum value; 2) the higher N %-th value; and 3) the highest frequent value included in the higher N %, from the above-described past records.

Although N may be set freely, the appropriate setting of N ranges from 1 to 20. The highest frequent value indicates the reception level that has the highest frequency of appearance when the past records of reception levels are observed in the frequency distribution.

The reference value thus calculated is stored in the reference reception level storage unit 125 in association with a radio signal transmitting terminal ID and a radio signal capturing terminal ID.

FIG. 21 shows an example of the reference reception level storage unit 125 when the reference reception level is determined for a combination of each [radio signal transmitting terminal ID, radio signal capturing terminal ID]. FIG. 22 shows an example of the reference reception level storage unit 125 when the reference reception level is determined for each of the radio signal capturing terminals 40a and 40b.

Moreover, the relative reception level determining unit 170 is configured to receive the radio signal reception levels obtained by the radio signal capturing units 41a and 41b through the reception level receiving unit 110.

Then, the relative reception level determining unit 170 is configured to calculate the relative reception level by the following equation.

Relative reception level=reception level obtained by a radio signal capturing unit−reference reception level In the reception level storage unit 123, the relative reception level determining unit 170 stores the relative reception level calculated by the above equation, in association with the "radio signal transmitting terminal ID", the "radio signal capturing terminal ID", the "reception level obtained by the radio signal capturing unit" and the "obtaining time."

FIG. 23 shows an example of the reception level storage unit 123 when the reference reception level is determined for a combination of each [radio signal transmitting terminal ID, radio signal capturing terminal ID]. FIG. 24 shows an example of the reception level storage unit 123 when the reference reception level is determined for each radio signal capturing terminal.

The presence area estimating unit 140 is configured to estimate the presence area of the radio signal transmitting terminal 10 by using the relative reception levels stored in the reception level storage unit 123.

The other functions of the presence area estimating unit 140 are the same as those in the first embodiment, and thus the explanation thereof is omitted here.

(Area Estimation Method)

Sequentially, an area estimation method of this embodiment will be described with reference to FIG. 25.

In order to operate the area estimation apparatus 100 of this embodiment, firstly, an administrator registers various attribute information and the reference reception level in step S301.

The registration of various attribute information (the presence areas of the radio signal capturing terminals) is the same as that in the first embodiment (step S101 in FIG. 2), and thus the explanation thereof is omitted here.

Moreover, the relative reception level determining unit 170 refers to the reception level storage unit 123 and determines the reference reception level for a combination of each [radio signal transmitting terminal ID, radio signal capturing terminal ID].

Alternatively, the relative reception level determining unit 170 refers to the reception level storage unit 123, and to determine the reference reception level for a combination of a radio signal transmitting terminal 10 and a radio signal capturing terminal. Here, the radio signal capturing terminal exists in the seat area of a user carrying the radio signal transmitting terminal 10.

Alternatively, the relative reception level determining unit 170 refers to the reception level storage unit 123 and determines the reference reception level for each of the radio signal capturing terminals 40a and 40b.

The area estimation apparatus 100 stores the reference reception levels thus determined in the reference reception level storage unit 125.

Steps S302 and S303 are the same as steps S102 and S103 in FIG. 2, and thus the explanation thereof is omitted here.

In step S304, the area estimation apparatus 100 stores the reception levels obtained from the radio signal capturing terminals 40a and 40b and the relative reception levels.

The storage of the reception levels is the same as that in the first embodiment (step S104 in FIG. 2), and thus the explanation thereof is omitted here.

The area estimation apparatus 100 calculates the relative reception levels based on the reception levels obtained by the radio signal capturing units 41a and 41b, and stores the calculated relative reception levels in the reception level storage unit 123.

In step S305, the area estimation apparatus 100 estimates the presence area of the radio signal transmitting terminal 10 by using the relative reception levels stored in the reception level storage unit 123.

(Operations and Effects)

In order to solve a problem that the obtained radio signal reception levels frequently varies due to the individual differences in the hardware which constitute the radio signal capturing units 41a and 41b, the area estimation system of this embodiment determines the reference reception level for the combination of the each [radio signal transmitting terminal ID, radio signal capturing terminal ID], or for the each radio signal capturing terminal 40a and 40b and utilize the variation amount between the reference reception level and the obtained reception level, thereby making it possible to neutralize the individual differences without performing a complicated calibration or the like.

In addition, according to the area estimation system of this embodiment, the presence area estimating unit 140 specifies the radio signal capturing terminals 40a and 40b having the maximum radio signal reception level, as the nearest radio signal capturing terminal. As a result, the individual differences can be neutralized only by setting, as the reference reception level, the reception level located at the nearest to each radio signal transmitting terminal for the combination of the each [radio signal transmitting terminal ID, radio signal capturing terminal ID], or for each of the radio signal capturing terminals 40a and 40b, that is, approximately the highest reception level value in the past records of reception level.

Modified Example

In the fourth embodiment, the relative reception level determining unit 170 automatically determines the reference reception levels. Alternatively, the administrator can manually modify the reference reception levels by using the operating unit 130, based on the result of a calibration which is performed in advance, by referring to the reference reception level storage unit 127.

In this method, the calibration needs to be performed in advance, but this previous operation makes it possible to set more accurate reference values, and thereby to improve the estimation accuracy of the presence area of the radio signal transmitting terminal 10.

In the fourth embodiment, a reference reception level is used as the reception level (a constant number). Instead, the reference reception level can be defined as a function which uses the current reference level as an argument.

Figures 25, 26, 27:
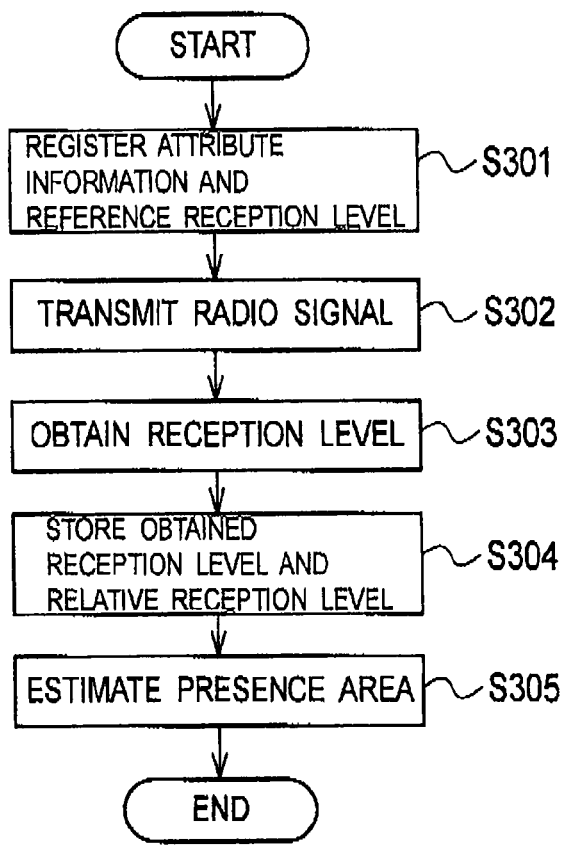
FIG. 25 is a flowchart showing an area estimation method according to the fourth embodiment of the present invention.
FIG. 26 is a view showing an example of information stored in a reference reception level storage unit according to a modified example of the fourth embodiment of the present invention.
FIG. 27 is a view showing an example of information stored in the reference reception level storage unit according to the modified example of the fourth embodiment of the present invention.

FIG. 26 shows an example of the reference reception level storage unit 125 when the function is determined for the combination of each [radio signal transmitting terminal ID, radio signal capturing terminal ID]. FIG. 27 shows an example of the reference reception level storage unit 125 when the function is determined for each of the radio signal capturing terminals 40a and 40b.

Fifth Embodiment

In the first embodiment, the presence area estimating unit 140 operates without considering a case where a plurality of indoor base stations 20 exist, and where the indoor base stations 20 each use different channels.

In contrast to this, the area estimation system of the fifth embodiment is configured such that a channel switching unit 180 is added so as to estimate the presence area of the radio signal transmitting terminal 10 even in an environment where a plurality of indoor base stations 20 exist and each of the plurality of indoor base stations 20 uses different channels.

(Area Estimation System)

Figure 28:
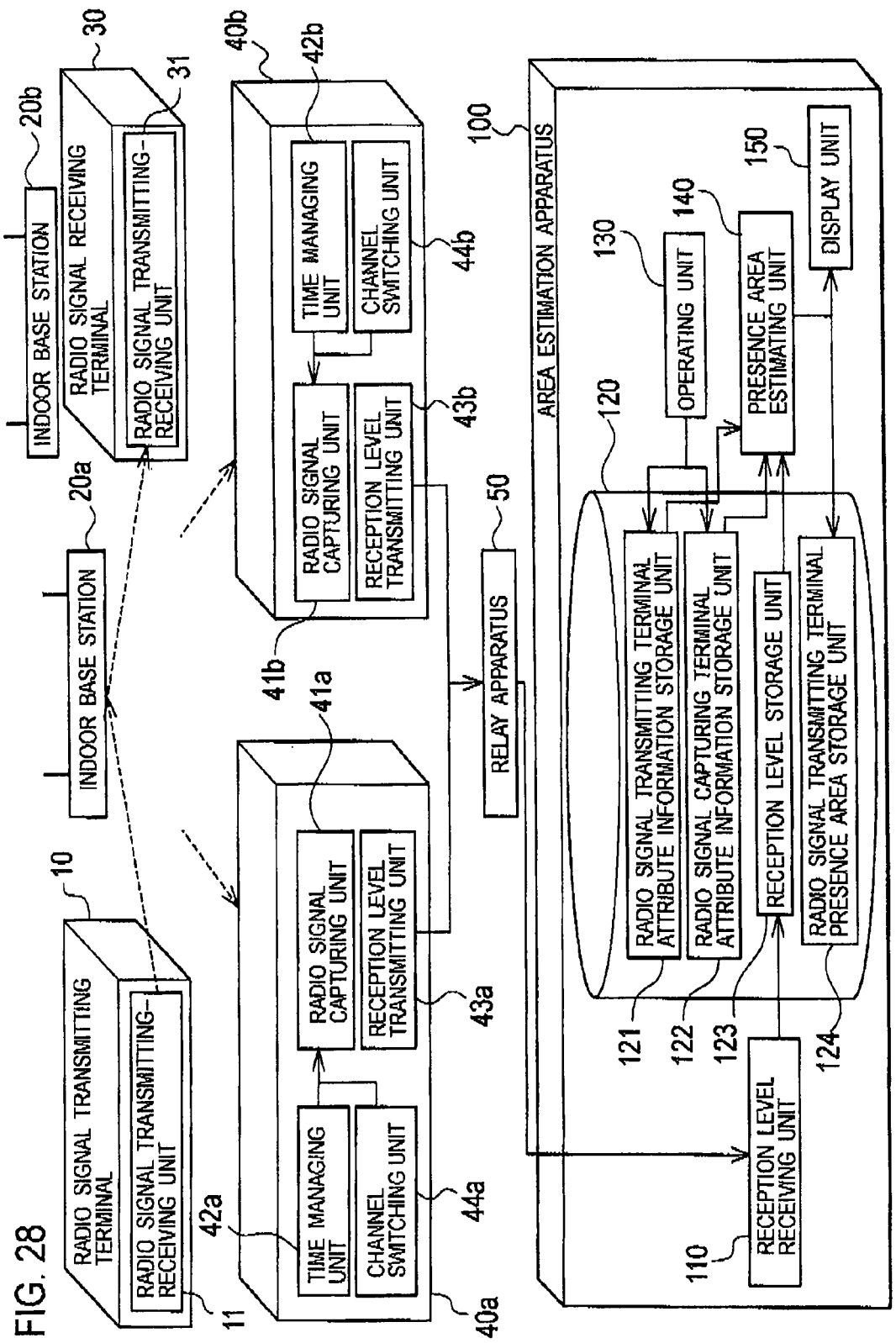
FIG. 28 is an entire configuration view of an area estimation system according to a fifth embodiment of the present invention.

As shown in FIG. 28, an area estimation system of this embodiment includes a radio signal transmitting terminal 10, indoor base stations 20a and 20b, a radio signal receiving terminal 30, radio signal capturing terminals 40a and 40b, a relay apparatus 50, and an area estimation apparatus 100.

The radio signal transmitting terminal 10, the indoor base stations 20a and 20b, the radio signal receiving terminal 30 and the relay apparatus 50 are the same as those in the first embodiment, and thus the explanation thereof is omitted here.

The radio signal capturing terminals 40a and 40b include radio signal capturing units 41a and 41b, time managing units 42a and 42b, reception level transmitting units 43a and 43b and channel switching units 44a and 44b.

The time managing units 42a and 42b are the same as those in the first embodiment, and thus the explanation thereof is omitted here.

The channel switching units 44a and 44b are configured to specify a channel to be used for transmitting the radio signal between the radio signal transmitting terminal 10 and the radio signal receiving terminal 30.

The channel to be specified can be configured to be set manually in the radio signal receiving terminal 30, or to be set automatically therein.

Here, in order to set a channel automatically, each of the channel switching units 44a and 44b of the radio signal capturing terminals 40a and 40b receives, on each channel, a beacon signal of an indoor base station 20 used for estimating the present area of the radio signal transmitting terminal 10, and specifies the channel on which the beacon signal using SSID of the area estimation system is detected (passive scan). Alternatively, each of the channel switching units 44a and 44b of the radio signal capturing terminals 40a and 40b transmits a probe request on each channel to the indoor base stations 20a and 20b of the area estimation system, and specifies the channel by using a probe reply from the indoor base stations 20a and 20b (active scan).

Furthermore, the channel switching units 44a and 44b further narrow the number of channels thus specified by means of any one of the following two methods 1) and 2):

1) each of the channel switching units 44a and 44b connects to each of the indoor base stations 20a and 20b where the beacon signals are detected, and then specifies an available channel on which the communication can be made, by transmitting a communication signal.

2) each of the channel switching units 44a and 44b obtains the reception levels of the beacon signals, and specifies only a channel which has a reception level larger than a set lowest limit value.

Then, when a plurality of channels used for transmitting the radio signal between the radio signal transmitting terminal 10 and the radio signal receiving terminal 30 exist, the channel switching units 44a and 44b instructs the radio signal capturing units 41a and 41b to specify the plurality of channels by switching from one channel to another at certain intervals.

The radio signal capturing units 41a and 41b switch the plurality of specified channels at certain intervals, capture, at each of the specified channels, a signal transmitted from the radio signal transmitting terminal 10, and obtain the reception levels.

Moreover, the radio signal capturing units 41a and 41b may obtain a usage state of available channels, on which communication can be made, and may capture a radio signal by switching only channels actually being in use, from one channel to another at certain intervals, respectively.

When the radio signal capturing units 41a and 41b capture, at a certain channel, a signal transmitted from the radio signal transmitting terminal 10, and obtain the reception levels of the signal thus captured, the reception level transmitting units 43a and 43b transmit the reception levels to the area estimation apparatus 100 either on the current channel, or on another channel on which the communication can be made, after the channel switching units 44a and 44b switch the channels to the channel on which the communication can be made.

Furthermore, the area estimation apparatus 100 includes a reception level receiving unit 110, a storage unit 120, an operating unit 130, the presence area estimating unit 140, and a display unit 150.

Moreover, the storage unit 120 includes a radio signal transmitting terminal attribute information storage unit 121, a radio signal capturing terminal attribute information storage unit 122, a reception level storage unit 123 and a radio signal transmitting terminal presence area storage unit 124.

The reception level receiving unit 110 receives reception levels of a plurality of signals (radio signals) transmitted from the reception level transmitting units 43a and 43b, and the presence area estimating unit 140 estimates the presence area of the radio signal transmitting terminal 10 by using the reception levels of the plurality of signals.

The other functions of the area estimation apparatus 100 are the same as those in the first embodiment, and thus the explanation thereof is omitted here.

(Area Estimation Method)

Figure 29:
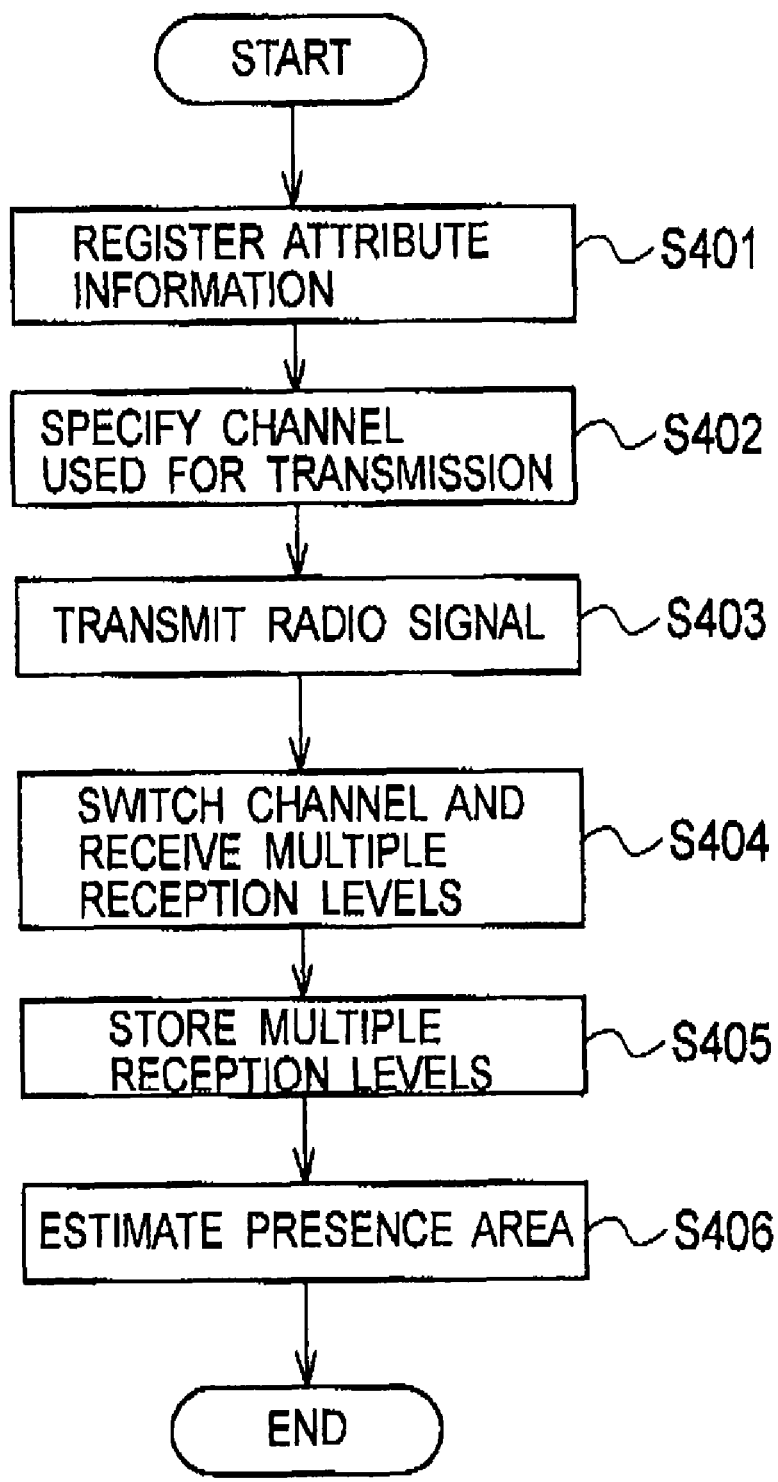
FIG. 29 is a flowchart showing an area estimation method according to the fifth embodiment of the present invention.

Sequentially, an area estimation method of this embodiment will be described with reference to FIG. 29.

In order to operate the area estimation apparatus 100 of this embodiment, firstly, an administrator registers various attribute information in step S401.

The registration of various attribute information (the presence areas of the radio signal capturing terminals) is the same as that in the first embodiment (step S101 in FIG. 2), and thus the explanation thereof is omitted here.

Thereafter, in step S402, the radio signal capturing terminals 40a and 40b specify a channel used for transmission of a radio signal (signal) between the radio signal transmitting terminal 10 and the radio signal capturing terminal 30.

Step S403 is the same as step S102 in FIG. 2, and thus the explanation thereof is omitted here.

In step S404, the radio signal capturing terminals 40a and 40b capture a signal from an available channel on which communications can be made, and obtain the reception levels of the captured signals.

At this time, when a plurality of available channels exist, the channel switching units 44a and 44b switch the available channels at certain intervals. For example, "at certain intervals" means every one second or the like.

At certain intervals on each of the channels, the radio signal capturing terminals 40a and 40b capture the signals transmitted from the radio signal transmitting terminal 10, and obtain the reception levels of the captured signals.

In step S405, the area estimation apparatus 100 stores the plurality of radio signal reception levels obtained from the radio signal capturing terminals 40a and 40b.

In step S406, the area estimation apparatus 100 estimates the presence area of the radio signal transmitting terminal 10 by using the plurality of radio signal reception levels.

(Operations and Effects)

According to the area estimation system of this embodiment, it is possible to properly estimate the presence area of the radio signal transmitting terminal 10, by switching the channels for communication at certain intervals and by measuring the radio signal reception levels respectively, even when a handoff is performed by the radio signal transmitting terminal 10 moving between the base stations, under an environment where a plurality of base stations (access points) using different channels exist and where the communication areas of the base stations (access points) overlap one another.

Additionally, according to the area estimation system of this embodiment, the radio signal capturing units 41a and 41b may obtain the usage state of the available channels so as to capture radio signals by switching only the channels actually being in use at certain intervals, and thereby obtain the plurality of radio signal reception levels.

Accordingly, even when the plurality of available channels exist, the usage state of the channels is checked and radio signal reception levels are obtained by dividing only the respective channels actually being in use at the certain intervals. Accordingly, it is possible to eliminate an unnecessary channel switching, and thereby to estimate the presence area of the radio signal transmission terminal 10 in real time.

Modified Example

Sequentially, a modified example of the area estimation system of this embodiment will be described.

The area estimation system of the foregoing embodiment handles only the channels on which the communication can be made.

However, the area estimation system of this embodiment may be configured to capture a signal on a channel on which only a beacon signal can be detected, as is the case with the channels on which the communication can be made.

In such case, although the signal can be captured, the obtained signal reception level cannot be transmitted. For this reason, it is necessary to manage the channels by dividing the channels into two categories of channels on which only a beacon signal can be detected, and of channels on which the communications can be made, and to transmit the obtained signal reception levels by using the channel on which the communication can be made.

The area estimation system of the foregoing embodiment is configured to switch the channels on which the communication can be made, at certain interval.

However, the area estimation system of this modified example may change a capturing time on each of the channels according to a certain condition. Three examples of the certain conditions will be described below.

The first condition is that a capturing time on each of the channel is changed according to the strength of a beacon signal or probe reply signal transmitted from the base stations 20a and 20b. In other words, the stronger the signal is the longer the capturing time period on each of the channels is set.

When the second condition is applied, the area estimation system of this modified example prepares two modes, that is, a "scan mode" and a "capture mode" and determines whether or not the mode should be changed to a capture mode based on whether or not a signal transmitted from the radio signal transmitting terminal 10 is captured in the scan mode.

In other words, the second condition is to set the capturing time Ts for the scan mode and the capturing time Tc for the capture mode, respectively.

Ts is desirably set to the shortest time period during which at least one signal can be captured. For example, Ts is set the shorter one of either 1 second, or a time period during which one signal is captured, or the like.

It is preferable that Tc is set to a time period required for estimating the presence area of the radio signal transmitting terminal 10. For example, Tc is set to 2 to 3 seconds, or the like.

There are also two methods for switching between the scan mode and the capture mode; an intermittent capture method and a weighed capture method.

In the intermittent capture method, the capture is carried out on all the channels on which the communication can be made in the scan mode. Then, signals are captured in the capture mode, only on the channels on which a signal from the radio signal transmitting terminal 10 is captured in the scan mode.

Figure 30:
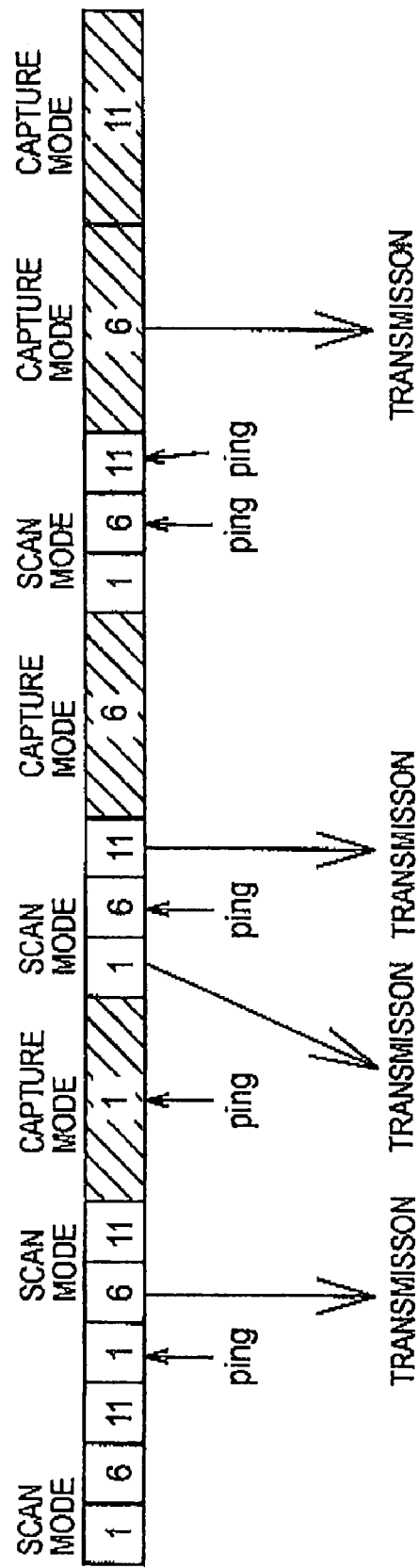
FIG. 30 is a view explaining an intermittent capture method in the area estimation system according to the fourth embodiment of the present invention.

FIG. 30 shows an example of the intermittent capture method when the communication can be made on channels 1, 6 and 11.

In FIG. 30, any signal cannot be captured when the capture is carried out on each of the channels in the scan mode, and therefore the capture is again carried out sequentially on each of the channels.

Then, a radio signal from the radio signal transmitting terminal 10 is captured only on the channel 1, and therefore the signal from the radio signal transmitting terminal 10 is captured only on the channel 1 in the capture mode.

In the weighed capture method, the capture is carried out sequentially on the available channels in the scan mode, and the radio signals are continuously captured in the capture mode when a radio signal from the radio signal transmitting terminal 10 can be captured.

Figure 31:
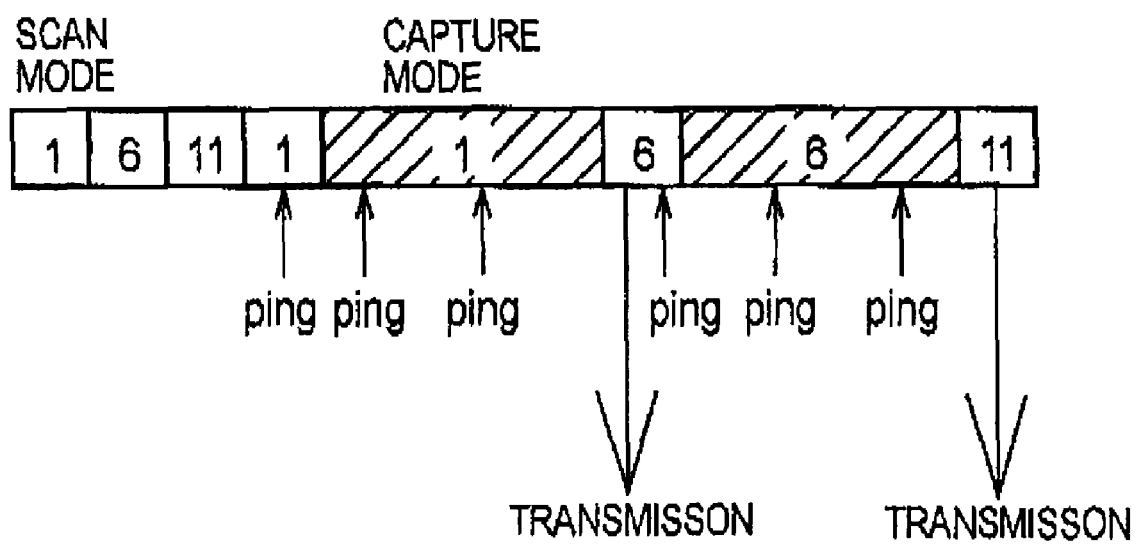
FIG. 31 is a view explaining a weighted capture method in the area estimation system according to the fifth embodiment of the present invention.

FIG. 31 shows an example of the weighted capture method where the communication can be made on channels 1, 6 and 11.

In FIG. 31, the capture is sequentially carried out on each of the channels in the scan mode. Since a signal from the radio signal transmitting terminal 10 can be captured on the channel 1 in the second round, the signal is continuously captured in the capture mode.

In the third condition, by means of beacon signals or the like transmitted from the indoor base stations 20*a* and 20*b*, the radio signal capturing terminals 40*a* and 40*b* are respectively configured to: periodically receive information on the number of the radio signal transmitting terminals 10 connected to the indoor base stations 20*a* and 20*b*; and to capture signals only on the channel used by the indoor base stations 20*a* and 20*b* having at least one radio signal transmitting terminals 10.

A beacon signal transmitted by the indoor base stations 20*a* and 20*b* is required to improve so as to include information on the number of radio signal transmitting terminals 10 being connected to the indoor base station. However, in IEEE802.11e and the like, this information is included in a standard specification.

Other Embodiment

Heretofore, the present invention has been described in detail by using the foregoing embodiments, but it is evident to those skilled in the art that the present invention is not limited to the embodiments described in the present specification. The present invention can be implemented as modified and changed modes without departing from the spirit and scope of the present invention defined by the statements of claims. Therefore, statements in the present specification aim at illustration and description, and do not restrict the present invention in any sense.

For example, in the area estimation system of each of the foregoing embodiments, the wireless LAN is assumed to be used in communications between the radio signal transmitting terminal 10 and the radio signal capturing terminal 30, but an active wireless tag may also be used.

In such case, a wireless tag is used as the radio signal transmitting terminal 10, and wireless tag readers are used as the radio signal receiving terminal 30 and the radio signal capturing terminals 40*a* and 40*b*.

Furthermore, the area estimation system of each of the foregoing embodiments may use Bluetooth (registered trademark).

In such case, the Bluetooth (registered trademark) terminal functions as any of the radio signal transmitting terminal 10, the radio signal receiving terminal 30 and the radio signal capturing terminals 40*a* and 40*b*.

What is claimed is:

1. An area estimation system comprising:
    a radio signal transmitting terminal configured to transmit a radio signal to a certain radio signal receiving terminal via a network, with a presence area of the radio signal transmitting terminal being unknown;
    a plurality of radio signal capturing terminals configured to capture the radio signal transmitted from the radio signal transmitting terminal, and to measure a radio signal reception level, with a presence area of the radio signal capturing terminals being known;
    a reception level receiving unit configured to receive, from each of the radio signal capturing terminals via the network, the measured radio signal reception level, a radio signal transmitting terminal ID for uniquely identifying the radio signal transmitting terminal, and a radio signal capturing terminal ID for uniquely identifying each of the plurality of the radio signal capturing terminals;
    a reception level storage unit configured to store the measured radio signal reception level, the radio signal transmitting terminal ID and the radio signal capturing terminal ID, which are received from each of the radio signal capturing terminals, in association with one another; and
    a presence area estimating unit configured to refer to the reception level storage unit and to estimate the presence area of the radio signal transmitting terminal, by using at least one presence area of at least one radio signal capturing terminal identified by at least one radio signal capturing terminal ID associated with a predetermined range of at least one radio signal reception level stored in the reception level storage unit,
    wherein the presence area estimating unit comprises:
    a presence area candidate estimating unit configured to refer to the reception level storage unit and to specify, as a presence area candidate of the radio signal transmitting terminal, the at least one presence area of the at least one radio signal capturing terminal identified by the at least one radio signal capturing terminal ID associated with the predetermined range of the at least one radio signal reception level; and
    a presence area candidate narrowing unit configured to estimate the presence area of the radio signal transmitting terminal, from the presence area candidate of the radio signal transmitting terminal, on the basis of a confidence factor calculated based on the at least one radio signal reception level.

2. The area estimation system according to claim 1, wherein the presence area candidate estimating unit is configured to refer to the reception level storage unit and to specify, as the presence area candidate of the radio signal transmitting terminal, at least one presence area of at least one radio signal capturing terminal which corresponds to a radio signal reception level having a value not less than a value obtained by subtracting a predetermined threshold value from a maximum value of the reception level.

3. The area estimation system according to claim 1, wherein, when a plurality of the radio signal capturing terminals identified by the at least one radio signal capturing terminal ID associated with the predetermined range of the at least one radio signal reception level are present in each of an area, the presence area candidate estimating unit is configured to specify, as a representative radio signal capturing terminal in each of the area, a radio signal capturing terminal associated with a radio signal reception level having a largest value, and the presence area candidate narrowing unit is configured to estimate the presence area of the radio signal transmitting terminal by using a radio signal reception level associated with the representative radio signal capturing terminal.

4. The area estimation system according to claim 3, wherein the presence area candidate narrowing unit is configured to calculate the confidence factor by using a relative ratio of the radio signal reception level associated with the representative radio signal capturing terminal, and to estimate, as the presence area of the radio signal transmitting terminal, at least one presence area of at least one radio signal capturing terminal having a total sum of the confidence factor being no less than a predetermined threshold value.

5. The area estimation system according to claim 4, further comprising a time managing unit configured to obtain time information indicating a time when each of the radio signal capturing terminals captures the radio signal,
wherein the reception level storage unit is configured to store the radio signal reception level, the radio signal transmitting terminal ID, the radio signal capturing terminal ID, which are received from each of the radio signal capturing terminals, and the time information, which is obtained by the time managing unit, in association with one another.

6. The area estimation system according to claim 5, wherein the presence area estimating unit is configured to estimate the presence area of the radio signal transmitting terminal in consideration of a past radio signal reception level measured by the radio signal capturing terminals.

7. The area estimation system according to claim 5, wherein the presence area estimating unit is configured to estimate the presence area of the radio signal transmitting terminal by using a latest radio signal reception level measured by the radio signal capturing terminals.

8. The area estimation system according to claim 5, wherein the presence area estimating unit is configured to estimate the presence area of the radio signal transmitting terminal by using a radio signal reception level measured at the same time as or a nearest time to a time when the certain radio signal receiving terminal receives the radio signal.

9. The area estimation system according to claim 1, further comprising an area estimation frequency determining unit configured to determine a frequency of the area estimation based on the presence area of the radio signal transmitting terminal, or attribute information of the radio signal transmitting terminal.

10. The area estimation system according to claim 9, further comprising a staying-moving judgment unit configured to judge whether the radio signal transmitting terminal is staying in an area or moving between areas, by using a past record of the radio signal reception level stored in the reception level storage unit, or a past record of the presence area of the radio signal transmitting terminal.

11. The area estimation system according to claim 10, further comprising a reception level-record-use number determination unit configured to determine the number of the past record of the stored radio signal reception level based on the judgment result of the staying-moving judgment unit,
wherein the area estimation frequency determining unit is configured to determine the frequency of the area estimation on the radio signal transmitting terminal, based on the judgment result of the staying-moving judgment unit.

12. The area estimation system according to claim 11, further comprising an area estimation frequency storage unit configured to store at least any one of the attribute information of the radio signal transmitting terminal, attribute information of each of the radio signal capturing terminals, and the frequency of the area estimation,
wherein the area estimation frequency determining unit is configured to determine the frequency of the area estimation based on at lease any one of the attribute information of the radio signal transmitting terminal, the attribute information of the radio signal capturing terminals, and the frequency of the area estimation, which are stored in the area estimation frequency storage unit.

13. The area estimation system according to claim 1, further comprising a relative reception level determining unit configured to refer to a past record of the radio signal reception level stored in the reception level storage unit, to determine a reference reception level for a combination of the radio signal transmitting terminal and each of the radio signal capturing terminals, or for the radio signal transmitting terminal, to store the determined reference reception level in a reference reception level storage unit, and to determine, as a relative reception level, a difference between the reference reception level and each of the radio signal reception level measured by each of the radio signal capturing terminals,
wherein the presence area estimating unit is configured to estimate the presence area of the radio signal transmitting terminal by using the relative reception level.

14. The area estimation system according to claim 1, further comprising a channel switching unit configured to instruct the radio signal capturing terminals to perform a detection on a plurality of channels by switching from one channel to another at certain intervals, when the plurality of the channels are used for transmitting the radio signal between the radio signal transmitting terminal and the certain radio signal receiving terminal,
wherein the radio signal capturing terminals are configured to capture the radio signal transmitted via the plurality of channels and to measure the radio signal reception level on the plurality of channels, and
the presence area estimating unit is configured to estimate the presence area of the radio signal transmitting terminal, based on the radio signal reception level on the plurality of channels.

15. The area estimation system according to claim 14, wherein the radio signal capturing terminals are configured to obtain a usage state of an available channel on which a communication can be made, to capture the radio signal by switching only channels being in use, from one channel to another at certain intervals, and to measure the radio signal reception level on the plurality of channels.

16. An area estimation method for estimating a presence area of a radio signal transmitting terminal by using a plurality of radio signal capturing terminals, with a presence area of the radio signal capturing terminals being known, comprising:
transmitting, at the radio signal transmitting terminal, a radio signal to a certain radio signal receiving terminal via a network;
capturing, at the radio signal capturing terminals, the radio signal transmitted from the radio signal transmitting terminal,
measuring, at each of the radio signal capturing terminals, a radio signal reception level;

receiving, from each of the radio signal capturing terminals via the network, the measured radio signal reception level, a radio signal transmitting terminal ID for uniquely identifying the radio signal transmitting terminal, and a radio signal capturing terminal ID for uniquely identifying each of the plurality of radio signal capturing terminals;

storing the measured radio signal reception level, the radio signal transmitting terminal ID, and the radio signal capturing terminal ID, which are received from each of the radio signal capturing terminals, in association with one another; and estimating the presence area of the radio signal transmitting terminal, by using at least one presence area of at least one radio signal capturing terminal identified by at least one radio signal capturing terminal ID associated with a predetermined range of at least one radio signal reception level, wherein estimating the presence area comprises:

referring to the stored radio signal reception level and specifying, as a presence area candidate of the radio signal transmitting terminal, the at least one presence area of the at least one radio signal capturing terminal identified by the at least one radio signal capturing terminal ID associated with the predetermined range of the at least one radio signal reception level; and estimating the presence area of the radio signal transmitting terminal, from the presence area candidate of the radio signal transmitting terminal, on the basis of a confidence factor calculated based on the at least one radio signal reception level.

17. An area estimation apparatus for estimating a presence area of a radio signal transmitting terminal which transmits a radio signal to a certain radio signal receiving terminal via a network, comprising:

a reception level receiving unit configured to receive, from each of a plurality of radio signal capturing terminals via the network, a radio signal reception level transmitted from the radio signal transmitting terminal, a radio signal transmitting terminal ID for uniquely identifying the radio signal transmitting terminal, and a radio signal capturing terminal ID for uniquely identifying each of the plurality of radio signal capturing terminals; with a presence area of the radio signal capturing terminals being known;

a reception level storage unit configured to store the received radio signal reception level, the radio signal transmitting terminal ID and the radio signal capturing terminal ID, which are received from each of the radio signal capturing terminals, in association with one another; and a presence area estimating unit configured to refer to the reception level storage unit and to estimate the presence area of the radio signal transmitting terminal, by using at least one presence area of at least one radio signal capturing terminal identified by at least one radio signal capturing terminal ID associated with a predetermined range of at least one radio signal reception level, wherein the presence area estimating unit comprises:

a presence area candidate estimating unit configured to refer to the reception level storage unit and to specify, as a presence area candidate of the radio signal transmitting terminal, the at least one presence area of the at least one radio signal capturing terminal identified by the at least one radio signal capturing terminal ID associated with the predetermined range of the at least one radio signal reception level; and a presence area candidate narrowing unit configured to estimate the presence area of the radio signal transmitting terminal, from the presence area candidate of the radio signal transmitting terminal, on the basis of a confidence factor calculated based on the at least one radio signal reception level.

* * * * *